(12) United States Patent
Zampini, II et al.

(10) Patent No.: US 7,729,941 B2
(45) Date of Patent: Jun. 1, 2010

(54) APPARATUS AND METHOD OF USING LIGHTING SYSTEMS TO ENHANCE BRAND RECOGNITION

(75) Inventors: Thomas Lawrence Zampini, II, Bedford, MA (US); Mark Alphonse Zampini, Morris, CT (US)

(73) Assignee: Integrated Illumination Systems, Inc., Morris, CT (US)

( * ) Notice: Subject to any disclaimer, the term of this patent is extended or adjusted under 35 U.S.C. 154(b) by 364 days.

(21) Appl. No.: 11/941,827

(22) Filed: Nov. 16, 2007

(65) Prior Publication Data

US 2008/0136356 A1    Jun. 12, 2008

Related U.S. Application Data

(60) Provisional application No. 60/866,286, filed on Nov. 17, 2006.

(51) Int. Cl.
*G06Q 30/00* (2006.01)

(52) U.S. Cl. .................................. 705/14.4; 705/14.72

(58) Field of Classification Search .................. 705/10, 705/14.19, 14.4, 14.72
See application file for complete search history.

(56) References Cited

U.S. PATENT DOCUMENTS

2003/0163367 A1 *    8/2003    Piepel et al. .................. 705/14

* cited by examiner

*Primary Examiner*—Thuy Vinh Tran
(74) *Attorney, Agent, or Firm*—Choate Hall & Stewart LLP; Christopher J. McKenna

(57) ABSTRACT

The present solution described herein provides systems and methods to coordinate and control the lighting of areas of a display unit in manner desired based on the type, brand and other characteristics of the product presented for display via the display unit. A lighting control system may control the characteristics of light emanating from one or more light sources to cause a reaction or visual effect from light reactive material of the product or display unit. In some cases, the lighting control system may control the characteristics of light emanating from one or more light sources based on signals from detectors, such as sensing any state or condition of the ambient environment.

21 Claims, 8 Drawing Sheets

APPARATUS AND METHOD OF USING LIGHTING SYSTEMS TO ENHANCE BRAND RECOGNITION

RELATED APPLICATIONS

This application claims benefit of U.S. Provisional Patent Application No. 60/866,286 entitled "Apparatus and Method of Using Lighting Systems to Enhance Brand Recognition" filed Nov. 17, 2006.

FIELD OF THE INVENTION

The present application is generally related to lighting systems. In particular, the present application is directed to systems and methods for improving marketability and enhance brand recognition of a product by controlling the light in the display unit presenting the product.

BACKGROUND

Color is a powerful means of communication and plays an important part in our everyday lives. Color can sway thinking, change actions, and cause reactions. It can irritate or soothe your eyes, raise your blood pressure or suppress your appetite. Corporations have always used color as a source of brand recognition and advertising. For example, it is a well known fact that in the majority of cases blue light suppresses appetite while red light increases hunger. For this reason, rarely are food advertisements the color blue or do you see blue light in restaurants. A University of Loyola, Md. study concluded that color increases brand recognition by up to 80 percent. Another independent study conducted by the secretariat of the Seoul International Color Expo 2004 yielded results which demonstrate the power of color in marketing. According to the survey, 92.6% of respondents said that they put most importance on visual factors when purchasing products, and when asked to approximate the importance of color by percentage when buying products, 48% of the respondents said 50-70 percent while 36.7 percent said 70-100 percent. This means that as much as 84.7 percent of the total respondents think that color accounts for more than half among the various factors important for choosing products.

Color does not just merely enhance memory and recollection of a product, but it also can subtly and quickly affect the decision making processes. In fact, CCICOLOR—Institute for Color Research studies concluded that people make a subconscious judgment about a product within 90 seconds of initial viewing and that between 62% and 90% of that assessment is based on color alone. Further research by the Henley Centre suggests that 73% of purchasing decisions are now made in-store. These studies further highlight the use of color in catching consumers' attention and quickly conveying brand identity to them to result in more successful sales.

Color influences brand identity in a variety of ways. Consider the success Heinz EZ Squirt Blastin' Green ketchup has had in the marketplace. More than 10 million bottles were sold in the first seven months following its introduction, with Heinz factories working 24 hours a day, seven days a week to keep up with demand. The result: $23 million in sales attributable to Heinz green ketchup (the highest sales increase in the brand's history). All because of a simple color change. Apple brought color into a marketplace where color had not been seen before. By introducing the colorful iMacs, Apple was the first to say, "It doesn't have to be beige". The iMacs reinvigorated a brand that had suffered $1.8 billion of losses in two years.

Different brands are recognized world wide for their corporate colors. For example, in soft drinks, the first brand associated with red is usually the Coca-Cola Company. Their branding is such a force in today's beverage market that red can almost be associated with Cola in general as several other major brands including Qibla and Tab among privately labeled grocery store brands all use red for advertising. In contrast to the Coca-Cola red is Pepsi who markets their brand in blue. The corporate colors of these two brands create distinction and uniqueness between their respective products.

SUMMARY

The present solution described herein provides systems and methods to coordinate and control the lighting of areas of a display unit in a manner desired based on the type, brand and other characteristics of the product presented for display via the display unit. A lighting control system may control the characteristics of light emanating from one or more light sources to cause a reaction or visual effect from light reactive material of the product or display unit. In some cases, the lighting control system may control the characteristics of light emanating from one or more light sources based on signals from detectors, such as sensing any state or condition of the ambient environment.

In one aspect, the present invention is related to a method for improving marketability of a product by controlling a characteristic of light emanating from a light source to an area of a display unit for presenting the product. The method provides a lighting control system which controls a light source emanating light toward an area of a display unit for presenting one or more products. The products include a light reactive portion reactive to one or more predetermined characteristics of light emitted by the light source. The lighting control system is configured to implement one or more characteristics of light emanating from the light source to correspond to the predetermined characteristics of the light reactive portion of the products. The lighting control system requests the light source to emanate light having the established characteristics onto the light reactive portions of products which react to the established characteristics of the emanating light.

In one embodiment, a light reactive portion of the one or more products includes an interior or an exterior surface of packaging having a coating responsive to a predetermined wavelength characteristic of a light source. For example, the coating may be a photoluminescent material, which is responsive to an ultraviolet (UV) light. Once the UV light source illuminates the coating, the coating absorbs the light and in response emits a light of its own via fluorescence. The light emitted from the coating may be of any color pigment, as determined by the molecular properties of the coating material. In another embodiment, the interior or the exterior surface of packaging having a coating responsive to a predetermined wavelength characteristic of a light source is associated with a system which includes a lighting control system configured such that one or more characteristics of the light to emanate from the light source correspond to the predetermined wavelength characteristic of the light reactive material.

In still another embodiment, a light reactive portion of the one or more products comprises a color pigment. In a further embodiment, the lighting control system is configured to implement one or more characteristics of the light to be emanated from the light source to change an appearance of the color pigment of a product to one of a different color or one having a different intensity of color. An example of this embodiment is a color rendering application in which red apples are stored in a refrigerator inside a supermarket. A lighting control system is configured such that a light source is instructed to illuminate the red apples with a light which makes the red apples appear more red than under a normal lighting. This attracts consumers' attention and improves marketability of the red apples displayed.

In one embodiment, the light reactive portion of the product includes a dye that is not visible in the presence of one or more wavelengths of light. For example, the product may include photoluminescent material comprising a red dye visible only when illuminated by a light source emanating light of a sufficient energy, such as an ultraviolet (UV) light source. In still a further embodiment, the light reactive portion of the product includes a dye visible only when illuminated with light having a predetermined wavelength. The lighting control system may be configured to emanate from the light source the light of the predetermined wavelength to activate the dye as visible. For example, an element of a display system may be designed with a surface that has a material with a dye that is not visible until illuminated by a UV light. In response to being illuminated by a UV light, the display element emits red.

In another embodiment, the light reactive portion of the product includes a dye that is not visible at one or more wavelengths of light. For example, the product may include a blue emitting organic photoluminescent material which is blue until illuminated by a blue light source of sufficient energy. In response to UV light, the organic material emits a green light via the process of photoluminescence. In this example, an element of a display system may be designed with a surface that has a material which remains blue until it is illuminated by a UV light, and then the display element, in response to the absorbed blue light, turns green. The light reactive portion may include any type of marketing feature such as a logo of a product, a product related message, a brand name or a company name. In one embodiment, the message may be provided in blue lettering, and upon exposure to blue light the letters emit green light. The blue light source may be hidden from a viewer of the marketing feature.

In another embodiment, the light reactive portion may include a message that is visible upon receiving light having a predetermined wavelength. The message may be, for example, any type of marketing feature such as a logo of a product, a product related message, a brand name or a company name. The lighting control system may be configured to emanate the light from the light source having the predetermined wavelength to make the message visible. In one embodiment, a lighting control unit controls a color, or an intensity of light emanating from the light source. In other embodiments, a lighting control system is configured to emanate from the light source a wavelength bin of a range of wavelength bins corresponding to the one or more predetermined characteristics of the light reactive portion. For example, a wavelength bin may be any predetermined spectral range of the light emanated, such as a range of 5 nm, 10 nm, or 100 nm.

In another aspect, the present invention is related to a method for improving marketability of products by controlling characteristics of light emanating from the light sources to areas of the display unit for presenting the products. The method provides a lighting control system to control one or more light sources to emanate light toward areas of a display unit for presenting one or more products. A first light source emanates light toward an area of the display unit for presenting a first product. A first detector detects presence of at least one unit of the first product in the first area of the display unit. In response to the detection, the lighting control system establishes one or more characteristics of light to emanate from the first light source to correspond to one or more predetermined characteristics of light identified for the first product. The lighting control system, in response to the detection, requests the first light source to emanate light having the established one or more characteristics.

In one embodiment, the lighting control system controls a second light source emanating light into a second area for presenting a second product. In yet another embodiment, one of the first detector or a second detector detects presence of at least one unit of the second product in the second area of the display unit. In a further embodiment, a lighting control system is configured to emanate one or more characteristics of light from the second light source to correspond to one or more predetermined characteristics of light identified for the second product, and to request the second light source to emanate light having the established one or more characteristics for the second product. In one embodiment, the first detector or a second detector detects presence of at least one unit of the second product in the second area of the display unit, and in response the lighting control system requests to emanate one or more characteristics of light from the second light source to correspond to one or more predetermined characteristics of light identified for the second product. For example, two sensors may be sensing the presence of two products in two given areas respectfully. Upon detecting a first product in an area, a lighting control system commands the light source associated with the first area to emanate light having predetermined characteristics for the first product. A second detector may also detect presence of products in the second area. The lighting control system in response to the detector, commands the light source associated with a second area to emanate light having predetermined characteristics for the second product, and the second product is illuminated. In response to further detections by the first detector or second detector, the lighting control system again changes the characteristics of the light emanating from the light sources to their respective areas.

In another embodiment, the first detector detects a movement of one or more units of the first product in the first area, and in response, the lighting control system changes one or more characteristics of light emanating from the first light source. In yet another embodiment, the first detector detects absence of one or more units of the first product in the first area, and in response to the detection, the lighting control system establishes one or more characteristics of the light emanating from the first light source. In still further embodiment, the lighting control system is configured such that each wavelength of light emanated is emanated from a different light source. In some embodiments, the detector associated with the first area may sense the second product in the first area, and sends a signal to the lighting control system. In response, the lighting control system commands the light source to change the characteristics of the light emanating the first area to be based on the second product. In other embodiments, the lighting control system changes configuration of the first source to the configuration of the second source, and changes configuration of the second source to the configuration of the first source. In this case, for example, as the result of changes the first light source emits the light having characteristics that second light source used to have, and the second light source emits the light having characteristics that the first light source used to have.

In another aspect, the present invention is related to a method for improving marketability of products by controlling characteristics of light from light sources emanating to areas of the display unit for presenting the products based on information about ambient environment of the products. The method provides a lighting control system to control one or more light sources to emanate light toward areas of a display unit for presenting one or more products. A first detector detects information about the ambient environment of the one or more products. A lighting control system establishes a predetermined characteristic of light to emanate from at least one light source of a group of light sources to correspond to the predetermined characteristics of light based on the detected information about the ambient environment. The lighting control system, in response to the detection, requests the light source to emanate light having the established predetermined characteristics.

Details of various other embodiments of the present invention are described in the detailed description below.

BRIEF DESCRIPTION OF THE DRAWINGS

The foregoing and other objects, aspects, features, and advantages of the present invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION

For purposes of reading the description of the various embodiments of the present invention below, the following descriptions of the sections of the specification and their respective contents may be helpful:

Section A describes a lighting environment for controlling and managing lights directed to products in a display, and the process of light emission from the products illuminated;

Section B describes embodiment of a computing device useful in one or more embodiments of the lighting control system; and Section C describes embodiments of methods for practicing the techniques of controlling and managing lights directed to products in a display.

A. Lighting Control Environment for Display of Products

Figure 1A:
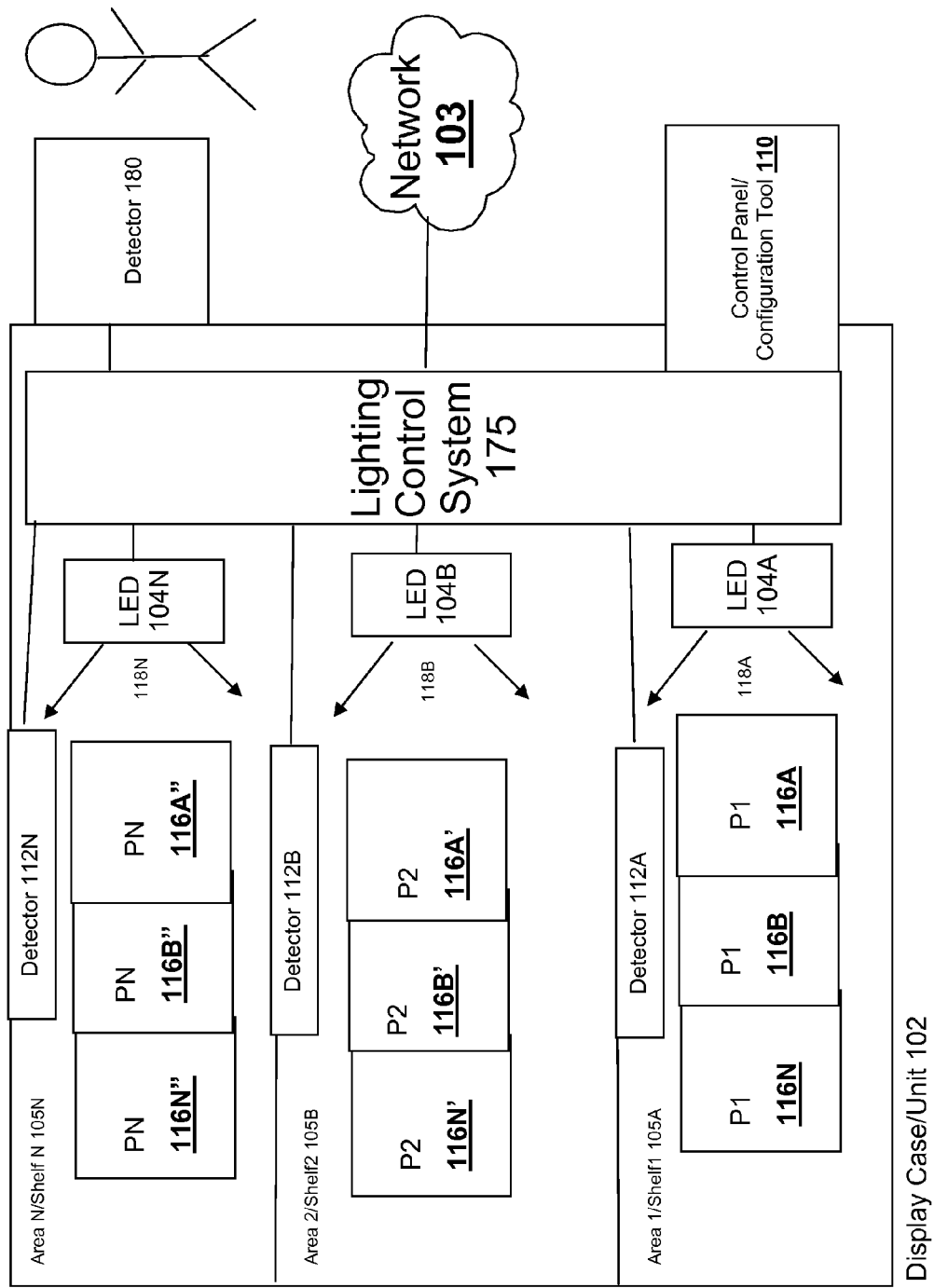
FIG. 1A is a block diagram that depicts an embodiment of a environment for providing control and management of light sources in association with products presented for display.

FIG. 1A illustrates a block diagram of a system for coordinating and controlling lighting of areas of a display unit presenting the products for display and marketing. The system includes a display unit 102 having one or more shelves or areas 105A-105N for presenting one or more products P1-PN which may include individual products 116A-116N. A lighting control system 175 (LCS) may be integrated or used in conjunction with the display unit 102 to coordinate and control one or more light sources 104A-104N, such as Light Emitting Diodes (LEDs) emanating light 118A-118N towards the areas 105A-105N and/or products 116A-116N. The lighting control system 175 may have a control panel or configuration tool 110 (CT) for establishing the characteristics of the light, such as wavelength and frequency, emanating from the light sources 104A-104N. The LCS may communicate via a network 103 to receive configurations, instructions or other information for use in coordinating and controlling illumination in association with the display unit 102. The display unit 102 may also include one or more detectors 112A-112N for detecting information about the environment and/or products P1-PN. The LCS may receive this information from the detectors 112A-12N and responsive to the information change or adapt the characteristics of the light 118A-18N emanating from the light sources 104A-104N. The display unit 102 may also include a detector 180 for detecting environment and other information external to the display unit 102 or otherwise in the surrounding environment, such as movement of people near the display unit 102.

The display unit 102, also referred to as a display case 102, may include any type and form of structure of any type of material for storing, display, presenting or otherwise providing for one or more products 116. In one embodiment, the display unit comprises a refrigeration unit, such as a home or a commercial refrigerator. In another embodiment, the display unit comprises a shelf or a series of shelves for storage and display. In yet another embodiment, the display unit comprises a counter, or a group of counters such as counters in supermarket aisles. In some other embodiments, the display unit may be a cooler. In yet another embodiment, the display unit is a cart or a kiosk where the products are displayed. In another embodiment, the display unit may be a portion of a store, or of a mall where products or product related materials are placed on a display. In yet another embodiment, the display unit may be an area on a trade show designated for display of brand products. In yet another embodiment, the display unit may be an area outside of any enclosed space, such a visible place next to a busy intersection, a street corner, or a square. Display unit 102 may therefore be any type of environment, enclosed or not enclosed where any products or product related materials may be displayed. As will be discussed in FIG. 1B, any portion of the display unit may include light reactive materials.

The display unit 102 may be installed, deployed or otherwise provided in any type and form of environment. In one embodiment, the display unit is deployed in any kind of retail environment, such as a store, mall, etc. In another embodiment, the display unit may be deployed in retail environment, such as a grocery store. In yet another embodiment, the display unit may be deployed in a mall or a trade show. In some embodiments, the display unit may be deployed in a museum. In other embodiments, the display unit may be deployed in a home. In one embodiment, the display unit may be deployed in a stadium. In yet some embodiments, the display unit may be deployed in a movie theater. In further embodiments, the display unit may be deployed on a busy street or a city or town square. In yet another embodiment, the display unit may be deployed in a window of a store or a gallery. In yet one embodiment, the display unit may be deployed next to a stage on an open space where a concert is being held.

The display unit 102 may be designed or constructed to have any combination or arrangement of one or more areas or shelves 105. In one embodiment, the display unit may be designed or constructed to include vertical or horizontal shelves. In another embodiment, the display unit may be designed to have shelves of different sizes and shapes. In yet another embodiment, the display unit may be designed specifically for a particular product being displayed. In one embodiment, the display unit may be designed so to include grids. In some embodiments, the display unit may be designed from different materials, such as wood, plastic, glass, metal, etc. In other embodiments, the display unit may be designed with a material different from the display structure. In another embodiment, the display unit may be designed to include mirrors. In some other embodiments, the display unit may be designed to include materials affecting trajectory of light, such as a light diffusing material, prism, etc. In yet another embodiment, the display unit may be designed to include materials that react to light. In yet another embodiment, the display unit may be designed to include portions of the product related displayed material such as plates with logos, objects comprising logos or company name, product related graphics, or other similar product or company related features. In a further embodiment, the areas/shelves 105 may be designed to not include any of the display related features or graphics. As will be discussed in FIG. 1B, any portion of an area or shelf 105 of the display unit 102 may include light reactive materials.

The products 116A-116N", generally referred to as product 116, may include any type and form of product or product related material. The products 116A may include consumer tangible items, consumables, commercial marketing collateral, etc. In one embodiment, the product 116 may be a food related product, such as a vegetable, a fruit, or a package containing meats or precooked foods. In another embodiment, the product 116 may be clothes or shoes, such as a specific brand. In yet another embodiment, the product 116 may be an electronics related product, such as a TV set, a DVD set, or a surround sound system. In yet another embodiment, the product 116 may be a video game or a CD or a DVD for listening, viewing, or computer use. In some embodiments, the product 116 may be flowers stored in a flower store. In another embodiment, the product 116 may be a piece of furniture or a piece of art such as a picture. In still another embodiment, the product 116 may be an electronic gadget such as a cell phone, blackberry, or a music playing device. In yet another embodiment, the product 116 may be a product related material used for advertisement only. In further embodiment, the product 116 may include marketing collateral, sales materials, product demonstrators, or marketing gadgets.

The detector 112 may comprise any type and form of hardware, software or combination of software and hardware for sensing, detecting or monitoring any type of information, including static or varying state conditions, such as environmental temperature, humidity, pressure, wind speed, wind direction, ambient light level, motion, speed, proximity, touch, color, metal, fluid flow and acoustic amplitude. The detector 112 may detect emission or radiation of any type and form of heat, fumes, chemical, gas, or other materials. In some embodiments, the detector 112 includes a light sensor used for detecting any wavelength and/or frequency of light. In one embodiment, the detector 112 includes a sensor for detecting light within the display unit. In another embodiment, the detector 112 includes a sensor detecting ambient light. In other embodiments, the detector includes a color sensor for sensing a color of one or more products 116 and/or the display unit 102, or any portions thereof. In some embodiments, the detector 112 is a color temperature sensor for detecting color temperature of a light source chromatically by comparing with a predetermined heated black body radiation. A color sensor may use any type of color indexing to indicate color, such as the index referred to as the Color Rendering Index measured on a 0-100 scale. In another case, the detector 112 may indicate or identify color temperature on any temperature scale, such as degrees Kelvin. In some embodiments, the detector 112 detects or senses the light characteristics, color, and/or color temperature emanating or produced by any of the light sources 104A-104N.

In other embodiments, the detector 112 includes a motion sensor for detecting movement of product within, into or near the display unit. In some embodiments, the detector 112 senses motions outside the display unit 102, such as movement of objects or persons. For example, a detector 112 may determine if there are any persons in vicinity of the display unit 102, such as in order to send a signal to turn the system or a light source on. In one embodiment, the detector 112 includes a temperature sensor for providing a reading of ambient temperature, or temperature related to the products 116, display unit 102 or the environment of the display unit 102. In still further embodiments, the detector 112 includes any type and form of sound or audio sensor for detecting audio signals or sound within or near the display unit or otherwise in the environment. In another embodiment, the detector 112 includes a radio frequency sensor. The detector 112 may receive and/or transmit any information obtained via radio frequency identification tags, referred to as RFID tags. In one embodiment, the detector 112 includes any type and form of bar code reader, for example, to read any barcodes provided via a product 116 or on the display unit 102. In some embodiments, the detector 112 includes a weight sensor for detecting weight of any object, such as a product and/or shelf/area. In other embodiments, the detector 112 includes a pressure sensor for sensing any level of pressure, such as pressure on a shelf of the display unit. In another embodiment, the detector 112 includes a touch sensor for sensing any type, form and level of touch.

One or more detectors 180 may be installed, configured or provided to detect a condition outside of the display unit 102. The detector 180 may comprise any of the types of detectors or sensors described with respect to detectors 112. As such, the detector 180 may sense, detect or monitor any type of information, including static or varying state conditions, such as environmental temperature, humidity, pressure, wind speed, wind direction, ambient light level, motion, speed, proximity, touch, color, metal, fluid flow and acoustic amplitude. In some embodiments, the detector 180 is the same as detector 112. In other embodiments, the detector 180 is different than detector 112.

Any of the types of detectors 112 and/or 180 may include any predetermined thresholds, sensing levels or operating parameters for which to monitor and measure the condition for which the detector is designed and constructed. In one embodiment, the detectors 112 and/or 180 may include predetermined thresholds for which the detector 112 communicates, reports or otherwise provides a detection or information about a detection. In some embodiments, the detectors 112 and/or 180 may be configurable and/or programmable dynamically, statically or otherwise. For example, the lighting control system 175 or configuration tool 110 may communicate with any detector 112 or 180 to establish, provide or otherwise modify any operating parameters, sensing levels or detection and/or reporting thresholds. In another example, a detector may be configured or programmed via any type and form of computing device in communication via a network to the detector, such as over the Internet, or otherwise attached locally to the detector.

In some embodiments, the detector 180 is attached to or connected to the display unit 102, such as via any external surface of the unit 102. In other embodiments, the detector 180 is located inside the display unit but directed or intended to sense conditions external to the display unit 102. In still further embodiments, the detector 180 is located remote to the display unit but in communication with the lighting control system 175 via a network 103, or otherwise via a wired or wireless type of connection or communication channel. The detector 180 may be located in the proximity of the display unit. In another embodiment, the detector 180 may located outside of the proximity of the display unit, including any length of distance away. For example, a detector 180 located in one building or location may communicate conditions to the lighting control system in another building or location.

Any of the detectors 112 and/or 180 may be of the same type of detector or different type of detectors. Any combination and number of detectors may be deployed in the display unit, in proximity to the display unit and/or external or remote to the display unit. In some embodiments, a first area of the display unit may have a plurality of detectors 112 of the same type or different type for providing detected information in association with the first area. In other embodiments, a first detector 112 or 180 may be used for a first area and a second detector 112 or 180 for a second area. In another embodiment, a first detector 112 or 180 may be used for a first product P1 and a second detector 112 or 180 for a second product P2. In yet one embodiment, a first detector 112 or 180 and second detector 112 or 180 may be used for a single area or product. In some embodiments, a first detector 112 or 180 may be sued for a plurality of areas and/or a plurality of products. In still further embodiments, a plurality of detectors 112 and/or 180 may be used for a predetermined area and/or predetermined product.

A light source 104A-104N (LED 104A-104N), also referred to as LED 104 and in some embodiments LED 104 may comprise any type and form of device, material or product capable of producing or emanating light. In one embodiment, the light source may be a semiconductor light emitting device. In another embodiment, the light source may be a light bulb or a broadband lamp. In some embodiments, the light source may be a black light. In other embodiments, the light source may be a hollow cathode lamp. In another embodiment, the light source may be a neon or argon lamp. In another embodiment, the light source may be a plasma lamp. In another embodiment, the light source may be a xenon flash lamp. In another embodiment, the light source may be a mercury lamp. In one embodiment, the light source may be a metal halide lamp. In some embodiments, the light source may be a sulfur lamp. In other embodiments, the light source may be a laser, or a laser diode. In yet another embodiment, the light source may be an OLED, PHOLED, QDLED, or any other variation of organic material containing light emitting device. In other embodiment, the light source may be a monochromatic light source. In another embodiment, the light source may be a polychromatic light source. In one embodiment, the light source may be a light source emitting light partially in the spectral range of ultraviolet light. In some embodiments, the light source may be a light source emitting light partially in the spectral range of visible light. In other embodiments, the light source may be a light source partially emitting light in the spectral range of the infra red light. In one embodiment, the light source may include a filter to control the spectral range of the light emitted. In another embodiment, the light source may include a light guide. In another embodiment, the light source may include a mirror. In yet another embodiment, the light source may include a light reactive material affecting the light emitted, such as a polarizer or a prism. In some embodiments, the light source may be a coherent light source. In other embodiments, the light source may be an incoherent light source.

In some embodiments of an LED as light source 104, the LED is any light emitting device, comprising one or more light sources and capable of providing light to the products presented in an Area, such as Area 105A in FIG. 1A. In other embodiments, the LED is a semiconductor light emitting diode producing an incoherent light of any given spectral or power range. In another embodiment, the light source is a UV emitting source used for illuminating the portion of the product having any luminescent or light reactive material, which upon being illuminated by a light source, absorbs the light from the source and in response produces its own light, in return. In yet another embodiment, LED 104 is a light source used for color rendering of the fruits, vegetables, meats or other products in the display 102, where light is emitted by the LED to slightly alter the color of the product as perceived by the human eye. In another embodiment, an array of light sources 104 are used to vary the wavelength and intensity of the light emitted. In yet another embodiment, the light source 104 is a monochromatic light source or LED, emitting only a single wavelength of light. In yet another embodiment LED may be a tunable light source, emitting a light of varying spectral range. In one embodiment, the LED may be a broadband light utilizing a filter for narrowing down the light spectral range. The LED may be any commercially available or custom made light source emitting light of any spectral or power range, any constant output or varying intensity, and any type of coherent or incoherent light. In another embodiment, the LED also has a light guide through which the light is delivered to the products.

In some other embodiments, the light source may create all of the basic colors, including variations there of by only selecting particular wavelengths, a process also known as binning. For example, Philips Lumileds Lighting Company categorizes blue LEDs as emitting wavelengths between 460 nm and 490 nm (Ref. AB21—Luxeon Product Binning and Labeling). However, they separate this 30 nm difference in wavelengths into 6 different "bins" varying by 5 nm each. The light output of the LEDs throughout these different bins vary to the human eye even though they are all characterized as "blue" LEDs. For example, bin 1 which is 460-465 nm will appear a very deep blue; however, bin 6 which is 485-490 will appear a very bluish green which some people might describe as aqua.

In some embodiments, binning is not used to control color in LED systems. Any hue or color may be created by mixing a group of primary colors, such as, for example, red, green and blue. In addition, even any two color LED's, not just the primary colors, may also be used to vary intensities within a region of a CIE color chart, such as red and amber for example. The ability of the light emitting devices to be controlled to the accuracy of 5 nm wavelength range allows them to create vibrant colors. In yet other embodiments, the varying an object's appearance of color pigments to human eye as the result of illumination using a specific spectral range of light is utilized. For example, an object of a yellow pigment will appear orange to a human eye orange when illuminated by purple light. In another example, a blue pigment will appear black to human eye when illuminated by orange light.

In yet another example, an object of a red pigment, when illuminated by a red light will be perceived by human eye as a lot more red.

Commercial refrigeration units are utilized all over the world and branded on the outside in addition to the product within. The branding on the outside is utilized to attract customers who are not in viewable range of the inside of the cooler. The lighting system disclosed herein utilizes light of a configurable wavelength, i.e., color, to not only to attract customers to the refrigeration unit, but to reveal its contents inside. The system allows the seller or vendor to select a particular color of light for the interior of the case which will be additive to the branding of the contents on the inside. For example, a soda manufacturer could coat or label a product with a message that is enhanced under blue light. The enhancement of the message as well as the new light of the enclosure (as opposed to the usual cool white) will attract customers to the product. However, once the product is removed from the enclosure, the message enhanced under the blue light may fade, revealing a new message on the product that was subtractive under the blue light.

In other embodiments, a blue light is used to "activate" fluorescent dyes that are normally not visible in normal light. In this application, the system may be installed with a particular blue wavelength specified by the seller of the merchandise inside of the cooler. The seller may print their packaging (frozen food, bottles, cans etc.) with a dye which is activated by the blue light. When the enclosure lighting is powered on, the seller's message will be displayed vibrantly to the consumer. In another embodiment, illumination properties of the lighting system are configurable, comprising a red, green, and blue system, and are capable of digitally generating particular colors depending on the merchandise being sold. Another embodiment, includes active and passive areas, which are defined within the display unit depending upon the specific product displayed. In this embodiment, an area is defined passive if the wavelength of the light illuminating the product is configured independently from the product actually displayed in the enclosure. An area is also defined active if a product detected by the system is placed within, and the LCS in response generates a specific brand enhancing light based upon the detected product. Detector circuits may include a detector module operable in conjunction with the LCS to determine the presence of a specific product, in response to presence of the product detected, issue a series of commands to emit the light having characteristics desirable to the product detected. In a further embodiment, a lighting control system may utilize a barcode reader to determine a product. In response to the barcode reader's determination, the lighting control system makes adjustments to the light characteristics emanated by the light source to accommodate the desired light ambiance of the product.

The light sources 104 may be arranged, organized, positioned, located, orientated or placed to emanate light in any suitable or desired manner and direction towards areas 105 of the display unit 103 and/or products 116, or any portions thereof. In some embodiments, a light source is oriented to direct light towards an entire area. In other embodiments, a light source is oriented to direct light towards a portion of an area. In one embodiment, a light source is oriented to direct light towards multiple areas. In another embodiment, a light source is oriented to direct light towards a set of one or more products. In some cases, the light source may be oriented to direct light towards a predetermined portion of a product, such as the middle, top or bottom portion of a product. In other cases, the light source may be oriented to direct light towards the first product in a set of products. In still further embodiments, multiple light sources may be oriented to direct lights towards the same product or area, or portion thereof.

Light emanating from the light source is identified as 118 in the FIG. 1A. For example, the light 118A emitted by the LED 104A illuminate the Area 105A in which the products P1, are being displayed. In some embodiments, the light emitted by the LED has a light spectrum which is higher energy than the visible light, such as UV light, for example. In other embodiments, the light 118 is any light in the visible range spectrum. In one embodiment, the light 118 comprises infrared light. In some embodiments, the light 118 may have a portion of light spectrum in the UV range and another portion at least partially in the visible range. In yet some other embodiments, the light 118 has a spectrum which is at least partially in the visible range and partially in the infrared range. Light 118 emitted by the light source 118 may be pulsed or varying in intensity, or continuous and/or without any interruption in emission. In cases in which light 118 is pulsed, the light 118 may be periodically or non-periodically pulsed, the pulsing of the light 118 may be predictable or random. The spectral range of the light 118 emitted may vary from a narrow spectral range such as a monochromatic light, for example, light from a single mode laser or a single mode laser diode, to a wide band white light such as from a white light source covering a spectral range of hundreds of nanometers. In some embodiments, the light 118 emitted from the light source 104 is a coherent light such as the light from a single mode laser source. In other embodiments, the light 118 emitted from the light source 104 is a can incoherent light such as from a semiconductor light emitting device. In another embodiment, the display unit may be a refrigerator comprising front glass panel or door that allows the product, and the contents of the light reactive material 114 of the product to be visible from outside the display unit.

Although the display unit is illustrated with a plurality of areas, detectors, products, and light sources, the display unit may include any combination of areas, products, light sources, and/or detectors. In some cases, the display unit may not include any detectors. In another embodiment, the display unit may include a single light source. In one embodiment, a display unit may include a plurality of detectors associated with a single area or a plurality of areas. In another embodiment, a display unit may include a plurality of light sources associated with a single area or plurality of areas. In yet another embodiment, a display unit may include a plurality of products displayed in a single area. In another embodiment, a display unit may include a plurality of areas associated with a single detector. In one embodiment, a display unit may include a plurality of light sources responsive to a single detector. In another embodiment, a display unit may include a plurality of areas associated with a single or a plurality of detectors. In some embodiments, a display unit may include a plurality of areas associated with either a single or plurality of products. In one embodiment, a display unit may include a plurality of detectors associated with either a single or plurality of products. In other embodiments, a display unit may include a plurality of light sources illuminating a single or a plurality of products. In another embodiment, a display unit may include a plurality of areas illuminated by either a single or a plurality of light sources. In yet another embodiment, a display unit may include a plurality detectors associated with either a single or a plurality of light sources. In some embodiments, a display unit may include a plurality of products illuminated by either a single or a plurality of light sources. A display unit may include any number of areas, detectors, products and light sources, associated with each other in any number of ways and combinations.

Still referring to FIG. 1A, the lighting control system 175 may include software, hardware, or any combination of software and hardware for controlling, managing or otherwise directing the operation and/or performance of one or more light sources 104A-104N. The lighting control system 175 may include any type and form of logic, operations or functions embodied in executable instructions or in any type and form of digital and/or analog circuitry for performing any of the operations described herein. The lighting control system 175 may include any type and form of executable instructions, including an application, program, library, process, service, task or thread. In one embodiment, the lighting control system 172 provides, includes and/or controls power to any of the light sources 104 and/or detectors 112 or 180.

The lighting control system 175 may include logic, functions or operations to establish, determine, adapt, coordinate, manage and/or control any characteristics of light produced, outputted, provided or otherwise emanating from one or more light sources 104A-104N, such as LEDs. In one embodiment, the lighting control system 175 establishes or controls a light source to produce or emanate a light of a predetermined wavelength. In another embodiment, the lighting control system 175 directs the light source to emanate a light having a wavelength in a predetermined range. In some embodiments, the lighting control system 175 directs the light source to emanate a light at a predetermined frequency or within a predetermined frequency range. In other embodiments, the lighting control system 175 adjusts one or more characteristics of the light to be emanated or emanating from the light source 104. In yet further embodiments, the lighting control system 175 establishes or adjusts the color and/or color temperature of the light to emanate from the light source. For example, the color may be established or adjusted based on a color rendering index or value thereof. In another example, the color temperate may be established or adjusted based on a temperature value, such as via the Kelvin scale.

For example, in some embodiments, responsive to information from any one or more detectors, the lighting control system 175 establishes or adjusts one or more characteristics of the light to be emanated or emanating from a light source 104. In other embodiments, responsive to information communicated via a network 103, the lighting control system 175 establishes or adjusts one or more characteristics of the light to be emanated or emanating from a light source 104. In another embodiment, the lighting control system 175 establishes or adjusts one or more characteristics of the light to be emanated or emanating from a light source 104 based on the display unit 102 and/or the products 116.

The lighting control system 175 may include any type and form of computing device, such as any of the embodiments or portions of the embodiments of the computing device 100 described below in conjunction with FIGS. 1E-1F. In some embodiments, the lighting control system 175 includes a central processing unit (CPU), a memory unit, a power supply and a current driving circuitry related to powering and controlling LEDs as light source, such as a LED 104A. In another embodiment, the lighting control system comprises a software application controlling the logic unit for managing the circuitry which powers up and controls an array of LEDs, such as the light sources 104A through 104N as depicted in FIG. 1A. In yet another embodiment, a lighting control system is a module comprising a CPU, a memory and a digital logic circuit subsystem associated with control and management of the LEDs, such as an LED 104A.

The lighting control system 175 may be a commercial off the shelf (COTS) system. In one embodiment, the lighting control system 175 may be a customized or proprietary system. In some embodiments, the lighting control systems 175 includes any of the lighting control systems, products or modules manufactured or provided by Integrated Illumination Systems, Inc. referred to as I2Systems, of Morris, Conn. An example of one embodiment of a lighting control system 175 is described in conjunction with FIG. 1D below. In this embodiment, a lighting control system 175 includes user interface modules and LED control modules to control and drive one or more LEDs as lights sources.

A command panel 110 also sometime referred to as configuration tool 110 may include software, hardware or any combination of software and hardware to configure or control any portion of the system, including the lighting control system 175, light source 104 and/or detectors 112, 180. In some embodiments, the command panel or configuration tool 110 is deployed on any type and form of computing device 100 as described in FIGS. 1E and 1F. The command panel may include any type and form of user interface to provide configuration, instructions or commands to setup, direct or change operation and/or performance of the system. In one embodiment, the command panel 110 may include a graphical user interface. In another embodiment, the command panel 110 may include any type and form of buttons, switches, or other physical elements by which a user may select, adjust or change operation of the system. In another embodiment, the command panel 110 may comprise a touch screen for selecting or manipulating graphical user interface elements to control or manage the system. As further described in an embodiment of the lighting control system 175 in FIG. 1D, a configuration tool 110 may be used to program and download instructions, commands or directives to any portion of the lighting control system 175. For example, the configuration tool 110 may provide a user interface for a user to configure and program the system to operate in accordance with any of the operations described herein The lighting control system 175, control panel 110 and/or any of the detectors 112 and 180 may communicate via any type and form of network 103. The network 103 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 103 may comprise a wireless link, such as an infrared channel or satellite band. The topology of the network 103 may be a bus, star, or ring network topology. The network 103 and network topology may be of any such network or network topology as known to those ordinarily skilled in the art capable of supporting the operations described herein.

Although FIG. 1A shows a network 103 connected to the lighting control system 175, any of the control panel, light sources, and detectors may be on the same network 103 or a different network 103' (not shown). Any of the detectors 112, 180 may communicate via a network 103, 103' to the lighting control system 175 and/or control panel 110. The networks 103 and 103" may be the same type of network or different types of networks. The network 103 may be a local-area network (LAN), such as a company Intranet, a metropolitan area network (MAN), or a wide area network (WAN), such as the Internet or the World Wide Web. The networks 103, 103' may be a private or public network. In one embodiment, network 103' may be a private network and network 103 may be a public network. In some embodiments, network 103 may be a private network and network 103' a public network. In another embodiment, networks 103, 103' may be private networks.

In view of the system presented in FIG. 1A, in some embodiments, the system represents a lighting system for the display of products in a variety of applications for the purposes of marketing and advertisement. The display unit presents the products or product related material within the light controlled environment. In some embodiments, the product is inside an enclosed area but may be visible to a consumer, inside or outside the display unit. The display unit may include any number of areas, each comprising controlled lighting provided via the light source associated with the area, tailored to the display needs of the given products within the area, while being centrally controlled a lighting control system. The advantage this system provides is an application solution for marketing and advertisement of products in any type of environment which may enhance or increase marketability of a brand name or a product related feature: ranging from beverages inside freezers, foods, consumables, clothes, shoes, appliances, and more.

Figure 1B:
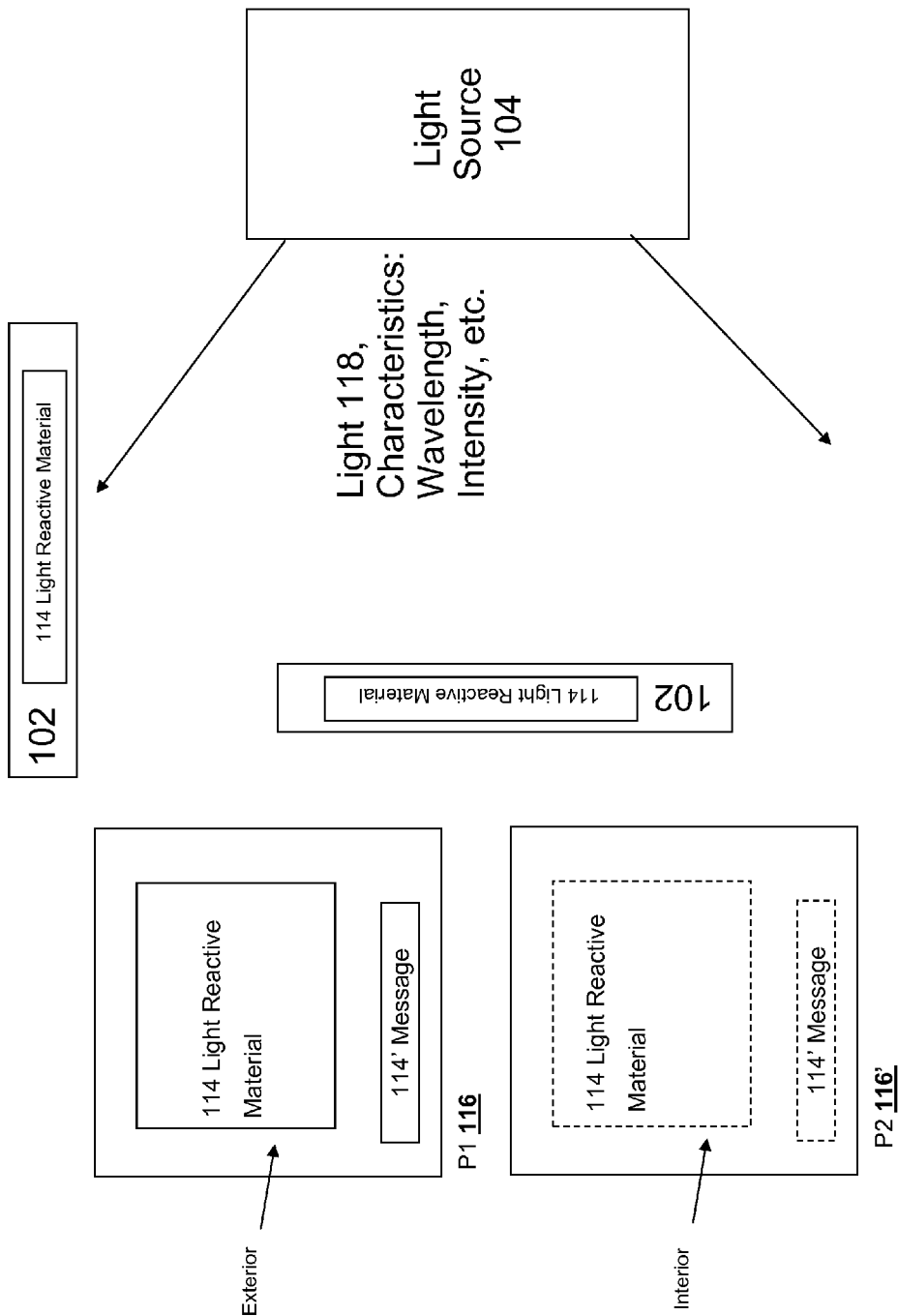
FIG. 1B is a block diagram that depicts an embodiment of packaging of a product that includes light reactive material.

Referring now to FIG. 1B, an illustration of portions of a product 116 and display unit 102 having light reactive materials 114 is depicted. In brief overview, any one or more products 116 may have light reactive material 114. The light reactive material 114 may be on any portion of the product 116, such as the exterior and/or interface surface of the product 116. In some cases, the product 116 may include lettering, messaging or other visual elements 114', such as trademark, symbol, or a company name, comprising the light reactive material 114. Likewise, any portion of the display unit 102, such as a shelf 105, may include light reactive material 114. The display unit 102 may include any visual elements, such as lettering or messaging with light reactive materials 114. Based on the type, form, design or construction, the light reactive material 114, 114, may respond or react to one or more characteristics of light, such as wavelength, frequency or intensity, emanating from a light source 104, such as an LED.

The light reactive material 114, 114' may comprise any type and form of material that has a reaction, response, change in appearance or effect from exposure to light having predetermined characteristics. In one embodiment, the light reactive material may be organic and may emit any type of light in response to absorption of light 118. For example, a thin film organic light reactive material having photoluminescent characteristics may absorb a light 118, and in response, emit a light whose characteristics are determined by molecular specifications of the light reactive material. In another embodiment, the light reactive material may be inorganic and may emit any type of light in response to absorption of light 118. For example, a quantum dot including inorganic materials may absorb a light 118, and in response, emit a light whose characteristics are determined by the molecular specifications comprising the quantum dot and by the size of the quantum dot. In another embodiment, a light reactive material may be a surface of an object illuminated by the light with characteristics tailored for color rendering of the object. For example, a red apple displayed in a refrigerator in a supermarket may be illuminated by a light whose color temperature is tailored such that it makes the red apple appear more red to the consumer. The surface of the red apple, as a result of the color rendering by the light source, is changing its appearance, and is therefore a light reactive material. In yet another embodiment, a light reactive material may be an object illuminated by a light source for the purpose of cleansing the object. For example, a vegetable is illuminated by an ultraviolet light source for the purpose of killing bacteria on the vegetable, the surface of the vegetable being the light reactive material. In yet another embodiment, a vegetable is illuminated by a light source with an enhanced 590 nm wavelength peak for the purpose of promoting the process of photosynthesis within the vegetable, the vegetable being the light reactive material.

Light reactive material may be any material that undergoes or expresses any type of reaction or change within the light reactive material, on the surface of the light reactive material, or in the appearance of the light reactive material as a response to the light emanating onto it. In one embodiment, the light reactive material may be a fruit. In another embodiment, the light reactive material may be a vegetable. In some other embodiment, the light reactive material may be any organic material. In one embodiment, the light reactive material may be any inorganic material. In some embodiments, the light reactive material may be a metal. In other embodiments, the light reactive material may be a product. In another embodiment, the light reactive material may be any material manifesting reflectance of light. In one embodiment, the light reactive material may be a metal. In yet another embodiment, the light reactive material may be a wood. In some embodiments, the light reactive material may be a photoluminescent material. In other embodiments, the light reactive material may be a fluorescent material. In yet other embodiments, the light reactive material may be a phosphorescent material. In some embodiments, the light reactive material may be a polymer. In some embodiments, the light reactive material may be a dye. In yet another embodiment, the light reactive material may be a quantum dot. In some other embodiment, the light reactive material may be an organic thin film. In another embodiment, the light reactive material may be a surface of a product package. In yet another embodiment, the light reactive material may be a glass. In still another embodiment, the light reactive material may be a semiconductor. In a further embodiment, the light reactive material may be an insulator. In some other embodiments, the light reactive material may be a plastic. In still another embodiment, the light reactive material may be a material reflecting light.

Light reactive material may comprise any portion of a product, product related materials, or a display unit. In one embodiment, an exterior surface of the product may comprise a light reactive material. In another embodiment, an interior surface of the product may comprise a light reactive material. In some embodiments, a label may comprise a light reactive material. In yet other embodiments, a trademark may comprise a light reactive material. In yet another embodiment, a barcode may comprise a light reactive material. In still another embodiment, product related graphics or features may comprise a light reactive material. In yet some other embodiment, a package of a product may comprise a light reactive material. In yet another embodiment, a company name may comprise a light reactive material. In some embodiment, a product related phrase or a feature may comprise a light reactive material. In some other embodiment, a product name or a product logo may comprise a light reactive material. In yet another embodiment, company related graphics may comprise a light reactive material. In still another embodiment, a message associated with a company or a product may comprise a light reactive material. In a further embodiment, a name may comprise a light reactive material. In yet other embodiments, a symbol may comprise a light reactive material. In some other embodiments, a vegetable may comprise a light reactive material. In one embodiment, a fruit may comprise a light reactive material. In another embodiment, an article of food may comprise a light reactive material. In yet another embodiment, a flower may comprise a light reactive material. In still another embodiment, a tree may comprise a light reactive material. In yet another embodiment, a plant may comprise a light reactive material. In a further embodiment, a stone may comprise a light reactive material.

Light reactive material may comprise any portion of a display unit, including any portions of subcomponents associated with the display unit. In one embodiment, the light reactive material may comprise a portion of an area. In another embodiment, the light reactive material may comprise graphics or symbols on the windows of the display unit. In yet another embodiment, the light reactive material may comprise a portion of a floor of the display unit. In one embodiment, the light reactive material may comprise a portion of a top of the display unit. In some other embodiment, the light reactive material may comprise a portion of a ceiling of the display unit. In yet another embodiment, the light reactive material may comprise a portion of a bottom of the display unit. In still another embodiment, the light reactive material may comprise a portion of a door handle of the display unit. In yet a further embodiment, the light reactive material may comprise a portion of a wall of the display unit. In yet another embodiment, the light reactive material may comprise a portion of a window of the display unit.

In one embodiment, the light reactive material may exhibit photoluminescence as a result of the light illuminating the light reactive material. In another embodiment, the light reactive material may exhibit fluorescence as a result of the light illuminating the light reactive material. In yet another embodiment, the light reactive material may exhibit a change in color as a result of the light illuminating the light reactive material. In some other embodiment, the light reactive material may exhibit a change in the appearance of color as a result of the light illuminating the light reactive material. In yet another embodiment, the light reactive material may exhibit a change in the amount of bacteria associated with the material as a result of the light illuminating the light reactive material. In another embodiment, the light reactive material may exhibit a change in characteristics as a result of the light illuminating the light reactive material. In yet another embodiment, the light reactive material may exhibit a change in ingredients as a result of the light illuminating the light reactive material. In some embodiments, color rendering is accomplished by illuminating the surface of a product and altering the color of the product as perceived by the human eye, where the light reactive material is the surface of a product given its change in color perceived. In some other embodiments, the light source may be biased or configured to deliver any specific wavelength of light to the plants, such as vegetables, fruits, flowers etc., in order to promote photosynthesis in the plants or increase the plants' levels of ingredients, such as vitamins, iron, calcium, magnesium, potassium, niacin, etc, while being illuminated. In yet other embodiments, the light 118 may be a light shifting color to create a visual effect, such as to emphasize a product or capture the attention of the consumer.

FIG. 1B also illustrates two display features, associated with display unit 102, and marked 114 light reactive materials. The display features illustrated do not necessarily have to be products or associated with the products displayed. In some embodiments, display features are associated with the display unit. In one embodiment, the display features are plates or stickers comprising a light reactive material 114 inside the unit and are associated with the product displayed. In yet other embodiments, the display features are plates or stickers inside the unit and not associated with the product displayed. In yet another embodiment, the display features are attachments on the shelves inside the unit. In some other embodiment, the display features are attached to the walls of the display unit. In another embodiment, the display features are attached to the windows of the display unit. In one embodiment, the display features are stand alone components standing outside of the area comprising products displayed, but still illuminated by a light source associated with the unit.

Figure 1C:
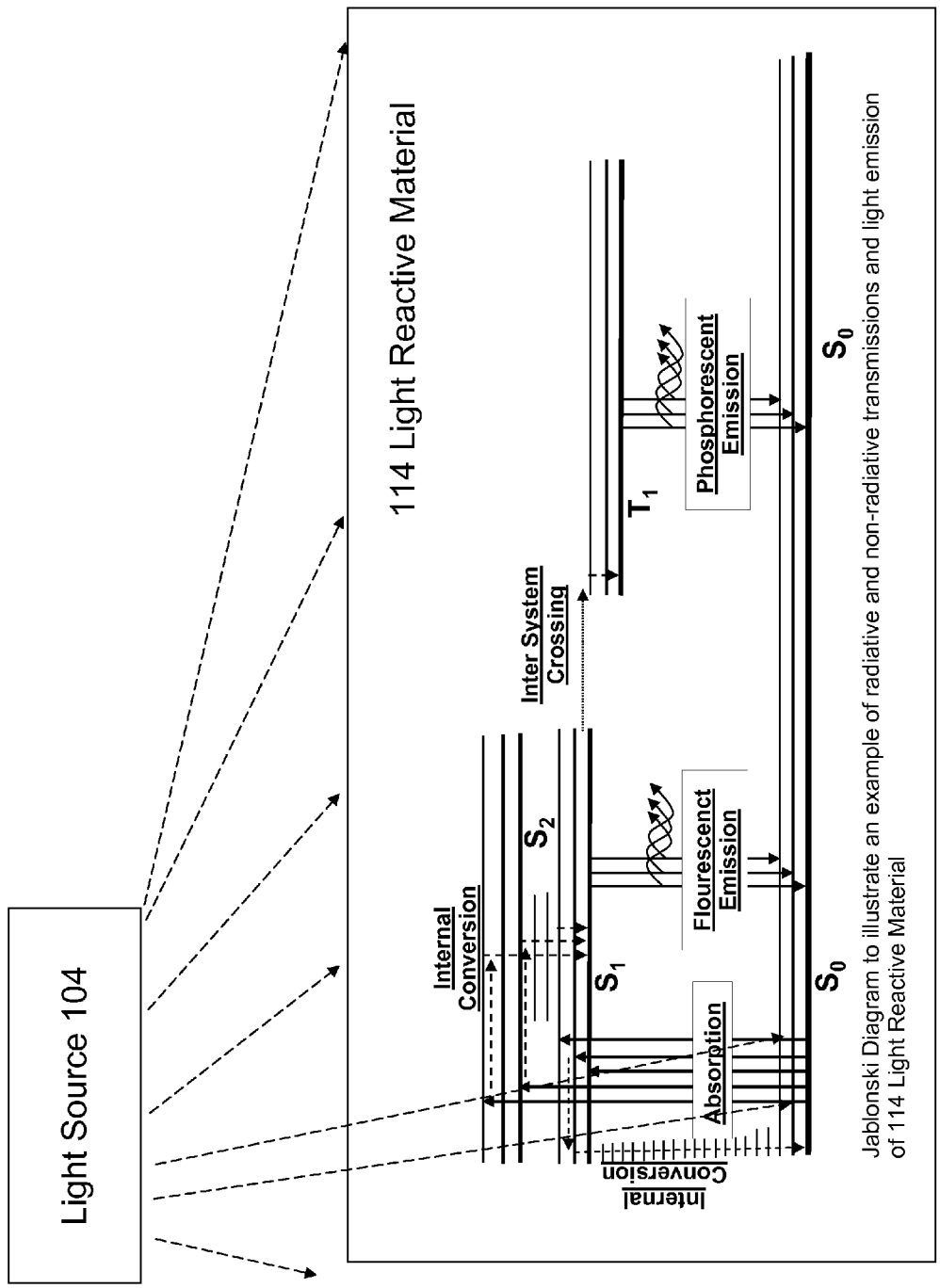
FIG. 1C is a block diagram that depicts another embodiment of light reactive material.

Referring now to FIG. 1C, an illustration of electronic states of molecules of light reactive materials 114 is depicted. FIG. 1C represents a physical phenomenon involving fluorescent and phosphorescent emission from the light reactive materials, such as the light reactive material 114 in this illustration. An embodiment of physical properties of the light reactive materials, such as the properties depicted in this illustration where a UV source, invisible to a human eye, may be used to excite the molecules of the light reactive material 114 to emit the light, capturing the attention of the consumer are described. The illustration shows a light source 104 illuminating a light reactive material 114, and as a result of illumination by the light source onto the light reactive material, a photoluminescence phenomenon is manifested. A diagram used to explain the photoluminescence phenomenon of a light reactive material 114, the Jablonski diagram, depicts electronic states of a molecule exhibiting fluorescence or phosphorescence and the transitions associated with them. The Jablonski diagram depicts electronic states of a molecule along with radiating and non-radiating transitions occurring between the electronic states, where the radiating transitions result in the light emitted from the molecule itself.

The thicker lines, within the diagram, are marked S0, S1, and S2, and correspond to singlet electronic states, while the T1, line corresponds to a triplet electronic state. Triplet states are metastable states of the molecule whose radiative emission is phosphorescent, while the singlet state radiation is fluorescent. The distance between the ground S0, state and the excited states above corresponds to the difference in energy between the two states. Thinner lines in the states correspond to the vibrational levels. The electronic energy levels of excited triplet states are normally lower than the electronic energy levels of excited singlet states of the same molecule.

Full bolded arrows up in the diagram in FIG. 1C, going from S0, ground state up to S1 state or above, correspond to the energies of photons from the light source 104 absorbed by the molecules of the light reactive material 114. The arrow lengths represent energies of the photons of light absorbed in comparison to the S1, S2, and T1, energy levels. When the energies of the photons absorbed exceed the S1, electronic state level, a molecule gets excited from a ground state to an excited state, enabling radiative or non-radiative transitions down to the ground state.

Dashed arrows on the diagram in FIG. 1C represent internal conversion, or the non-radiative conversion. Non-radiative conversions use vibrational level to release some or all of the energy absorbed by the photon, often creating heat in the system. The most left arrow on the graph represents a case where an excited molecule may have a complete non-radiative transition from the S1, to the S0, via vibrational levels. In other cases, non-radiative transition between vibrational states in between excited singlet states such as S1, or S2, leads to the extra energy being dissipated, resulting in the radiative transition where a photon of light is emitted from the molecule, the photon emitted having the energy, and thus the wavelength, associated with the difference in energies between the S0, and S1, levels.

Thinner full arrows up, going from S1, state to S0, or to vibrational states slightly above S0, represent fluorescent radiative emission, where a photon of light is emitted as the transition from S1, to S0, occurs. The photon energy and wavelength associated with fluorescent emission are determined by the distance between the transitioned energy levels during the transitional displacement. The wavy arrows originating from the arrow lines associated with fluorescent emission represent the photons emitted for each of the fluorescent transitions.

Inter-system crossing, or inter-system non-radiative transition, occurs between the singlet and triplet states and requires an interaction leading to a change of an electronic spin. As a result of inter-system crossing, a phosphorescent radiative emission occurs, and it is a slower process than a fluorescent radiative emission. The thinner full arrows going up, from T1, electronic state line to S0, ground state or the vibrational levels slightly above S0, represent the phosphorescent radiative emission transitions. Wavy arrows from these lines represent the photons of light emitted as the result of the phosphorescent emission.

Figure 1D:
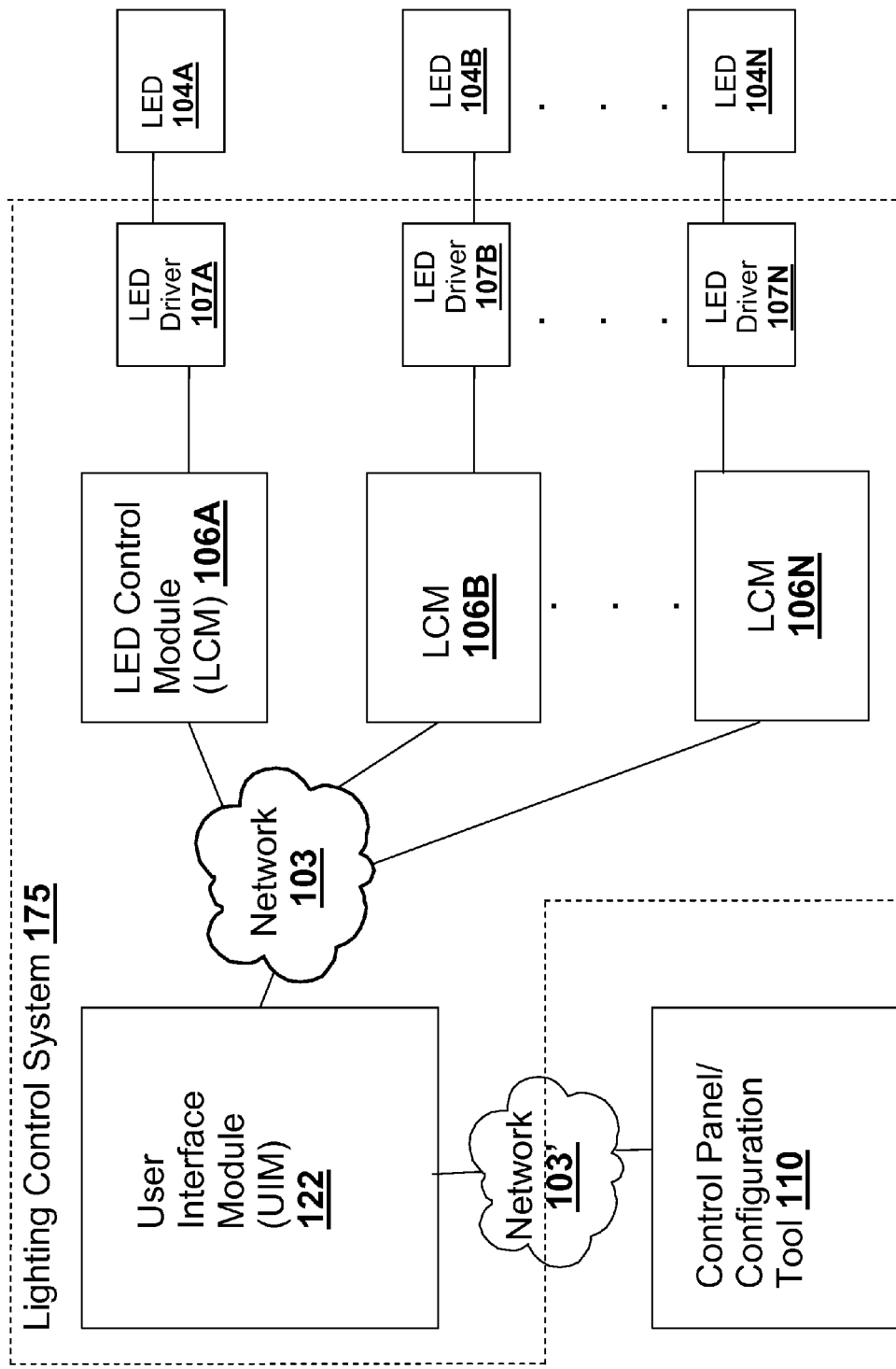
FIG. 1D is a block diagram that depicts an embodiment of a lighting control system.

Referring now to FIG. 1D, an embodiment of a lighting control system 175 is depicted. In brief overview, a lighting control system 175 includes one or more user interface modules (UIMs) 109 for controlling and managing one or more LED control modules (LCMs) 106A-106N (generally referred to as LCM 106). Each LED control module 106, in turn, may drive, control or manage an LED driver 107A-107N (generally referred to as LED driver 107) and a LED source 104A-104N (generally referred to as LED source 104). One or more LCMs 106A, LED Driver 107A and LED 104*a* may form a lighting group 176A or lighting sub-network. A configuration tool 110 (CSP) may be used to configure any of the logic, function or operations of the UIM 109 and/or LCM 106.

The lighting control system 175, sometimes referred to as lighting system, may include a plurality of network enabled devices, such as a network enabled UIM 109 communicating via a network 103 with one or more network enabled LCMs 106. As will be described in further detail below, each of these network enabled devices may have a network address for communicating with each other. Each of the network enabled UIMs 109 and LCMs 106A-106N may communicate via a wired and/or wireless network using any type and form of protocol. In some embodiments, the UIM and LCMs communicate over an Internet Protocol or Ethernet based network. In various embodiments, the lighting system 175 may be considered to include those lighting related devices in communication with each other to perform any of the functionality and operations described herein. As such, in some embodiments, the lighting system 175 includes the UIM 109 and one or more LCMs 106A-106N. In other embodiments, the lighting system 175 includes the UIM 109 and the LCM and any LED drivers 107A-107N and LEDs 104A-104N controlled and managed by the LCM and/or UIM. In yet another embodiment, the lighting system 175 includes the CSP 110 in communication with the UIM 109. In further embodiments, the lighting system includes the UIM 109, the CSP 110 and any LCMs 106A-106N.

In the lighting system 175, the UIM 109 provides various interfaces, such as analog or digital interfaces, that may be configured to perform tasks, such as any lighting related task described herein. The UIM 109 receives input from these interfaces that influences or controls output to the LCM 106, which in turn controls and drives the LED drivers 107 and LED source 104. A first UIM 109 may communicate via a network 103 with and manage a plurality of LCMs 106A-106N. In some embodiments, a plurality of UIMs 109A-109N may be used to communicate with and manage a plurality of LCMs 106A-106N. In other embodiments, a first UIM 109A and a second UIM 109B may both communicate with and/or manage the same LCM 106 or set of LCMs 106A-106N. In one embodiment, a UIM 106 may be used to communicate and manage a lighting group 176.

The UIM 109 may also provide status, feedback or any other information about the operation and performance of the lighting system 175, or any portion thereof, such as a specific LCM or LED driver. For example, the UIM may present a web page via the network 103 to a user to determine the status of various operational aspects of the lighting system 175. The UIM 106 may include any monitoring and/or logging agents to detect and capture any activity of the operations and performance of the lighting system 175, or any portion thereof. In one embodiment, the UIM 109 provides information on the status of the network 103 between the UIM and any LCMs 106. In another embodiment, the UIM 109 provides information on the status of an LCM 106.

The LCM 106 provides a mechanism and means to interface digital controls and logic to a typical or otherwise "dumb" LED fixture 104. The LCM 106 receives input, commands or instructions from the UIM 109 and/or CSP 120 with respect to controlling, managing, driving or otherwise directing the operation of the LED driver 107 and corresponding LED source 104. The LCM 106 provides any type and form of output to transmit signals to a corresponding LED driver 107. The LCM 106 may include any type and form of communication interface, analog and/or digital, to communicate with an LED driver 107. In some embodiments, the LCM 106 may communicate with the LED driver 107 via any type and form of software communication interface, such as an application programming interface (API). In other embodiments, the LCM 106 may communicate with the LED driver 107 using any type and form of hardware interface.

An LCM 106 may communicate with one or more LED drivers 107. In some embodiments, a first LCM 106A communicates with a first LED driver 107A and a second LCM 106B communicates with a second LED driver 107B, and a third LCM 106C communicates with a third LED driver 107C, and so on. In other embodiments, a first LCM 106B communicates with a first LED driver 107A and a second LED driver 107B. In yet another embodiment, a first LCM 106A and a second LCM 106B are both used to communicate with one or more LED drivers 107. In some cases, a second LCM 106B may be used concurrently with a first LCM 106A for communicating with an LED driver 107. In other cases, the second LCM 106 may used as backup or a redundant LCM to the first LCM 106A for communicating with one or more LED drivers 107.

The LED driver 107 may include any type of logic, function or operation for controlling the current and/or power delivered to an LED source 104. The LED driver 107 may include software, hardware or any combination of software and hardware. In various embodiments, the LED driver 107 functions as an electronically-controlled current source providing a predetermined amount of current to one or more attached LED lighting modules 104 in response to received control signals. In one embodiment, the LED driver 107 acts as or provides a constant current power supply configured to provide a set current value to the LEDs despite the input voltage to the luminaire. For example, an Advance Transformer LED driver 107 may take a 120VAC input and provide a 350 mA constant current output whereas the current is controlled and the voltage is stepped down, a typical "buck" topology. In some cases, the LED driver 107 may "boost" voltages in the case where the input voltage is lower than the forward voltage of the LEDs to be powered. In one case, the LED driver 107 may be configured as a "buck-boost" whereas the input voltage may be stepped up or stepped down as required. In some embodiments, these LED Drivers 107 offer dimming via a "PWM" (pulse width modulated signal), or analog control voltages including 0 to 10V control voltages. In other cases, the LED driver 107 may pulse the power input to the LED source on and off in order to adjust the intensity of the LED source 104.

The LED driver 107 may include a voltage-controlled current source, a current-controlled current source, a power MOSFET (Metal Oxide Semiconductor Field Effect Transistor), power amplifiers, power transistors, or high-current op-amps as well as resistive, capacitive and switching elements. In some embodiments, the LED driver includes current-limiting circuit elements at its output, so that current levels in excess of an LED's maximum rated value may not be exceeded. The driver 107 may include one or more input ports, e.g., a signal-control receiving port and an override control port, and one or more output ports, e.g., one or multiple signal output ports, a driver status port, and one or more current sensing ports. The LED driver 107 may receive and send pulse-width modulated signals, e.g., square wave signals with variable duty cycle. The input ports of the LED driver 107 may include over-voltage protection and surge protection to prevent damage by transient electrical fluctuations at its input ports.

In some embodiments, the LED driver 107 may be an ASIC (Application Specific Integrated Circuit), or a commercially produced, off-the-shelf LED driver chip. The driver 107 may be packaged in a housing, as a separate element of the lighting system 175, or may be incorporated into another element of the network or lighting group, e.g. into an LCM 106A or into an LED lighting assembly 104A. As an ASIC or commercially-available driver chip, the driver may be incorporated onto a printed circuit board (PCB) for custom-design or original-equipment manufacturing circuit applications. The LED driver 107 may have an external power supply, which powers internal circuitry in the driver and provides a source of amperage for the attached LEDs 104. The external power supply may be dedicated to the LED driver or shared with another element in the lighting system, e.g., an LCM.

In one embodiment, a first LED driver 107 communicates with or controls a single LED source 104. In other embodiments, a first LED driver 107A communicates with or controls a plurality of LED sources 104A-104N. In other embodiments, a first LED driver 107A communicates with or controls a first LED source 104A while a second LED driver 107B communicates with or controls a plurality of LED sources 104B-104N.

Examples of commercially-available LED drivers include an ADM8845 series LED driver chip, providing up to 30 mA current and connections for six LEDs, or an AD8240 series chip which must be used with an external transistor to provide sufficient drive current. Both of these driver chips are available from Analog Devices, Incorporated of Norwood, Mass. Other similar LED driver chips include: an FAN5607 LED driver chip, available from Fairchild Semiconductor Corporation of South Portland, Me., a STP16CP596 LED driver chip, available from STMicroelectronics of Lexington, Mass., or an LM27952 driver chip, available from National Semiconductor Corporation of Santa Clara, Calif. An example of a packaged LED driver includes an LEDD1 driver, available from Thorlabs of Newton, N.J., or a SmartDriver VDX driver, available from i2Systems of Morris, Conn.

The LED light source 104 may include any type and form of Lighting Emitting Diode (LED) based luminaire or luminaire source, such as an LED lighting assembly. In some embodiments, the LED 104 may comprise one or more semiconductor p-n junction light-emitting diodes. The LED assembly 104 may be constructed, designed or adapted to receive current from a LED driver 107 and direct the current across the one or more p-n junctions in forward bias. In various embodiments, the brightness or intensity of light output from a diode is substantially proportionally related to the amount of current flowing across the p-n junction. The LED source 104 may include resistors to limit current flow across the one or more diodes, and may include heat sinks in thermal contact with the diodes so as to dissipate from the diodes. Optical elements, such as lenses or diffusers may be placed over the LEDs to concentrate or disperse emitted light. Wavelength shifting methods, such as thin films containing organic fluorescent molecules or inorganic phosphorescent molecules, may be included with the diodes to absorb and re-emit radiation at wavelengths shifted from the LED's natural emission spectrum. The LED source 104 may include one or more diodes, each emitting radiation at distinct wavelengths, e.g. red, amber, green, and blue. In other embodiments, the LEDs may comprise organic light-emitting devices (OLEDs) or phosphorescent light-emitting devices (PHOLEDs) or a combination of LEDs, OLEDs and PHOLEDs. In some embodiments, the LEDs 104 within an assembly may be mounted on an electromechanically-moveable element, so that the direction of light output from the LED assembly may be controlled. In yet other embodiments, an LED driver 107 may be incorporated within the LED lighting assembly 104.

Examples of commercially-available LED lighting assemblies or LEDs include the VML lighting assembly series, the Apeiron SDi Tri-Light, the V-Line series lighting assemblies, all available from i2Systems of Morris, Conn. Additional examples include the Lumispot or LinkLED lighting assemblies, available from Dialight Corporation of Farmingdale, N.J. or the Titan LED Light Engines available from Lamina of Westamptom, N.J. Alternatively, examples of individual LEDs include the ASMT series light sources, available from Avago Technologies of Andover, Mass.

Although FIG. 1D shows a network 103 and network 103' (generally referred to as network(s) 103) between the UIM 109 and the LCMs 106 or CSP 120 the UIM 109, LCMs 106 and/or CSP may be on the same network 103. The networks 103 and 103" may be the same type of network or different types of networks. The network 103 may be a local-area network (LAN), such as a company Intranet, a metropolitan area network (MAN), or a wide area network (WAN), such as the Internet or the World Wide Web. The networks 103, 103' may be a private or public network. In one embodiment, network 103' or network 103" may be a private network and network 103 may be a public network. In some embodiments, network 103 may be a private network and network 103 a public network. In another embodiment, networks 103, 103' may be private networks.

B. Computing Device

The configuration tool or control panel 110, and the lighting control system 175, or any portion thereof, may be deployed as and/or executed on any type and form of computing device 100, such as a computer, network device or appliance capable of communicating on any type and form of network and performing the operations described herein. In some embodiments, any of the functionality, operations or logic of the UIM 109, LCM 106, LED Driver 107 and/or LED 104 described herein may be supported by, configured via, performed by or deployed on a computing device 100. In other embodiments, any portion of the UIM 109, LCM 106, LED Driver 107 and/or LED 108 may include or comprise any portion of the computing device 100 described below.

Figure 1E:
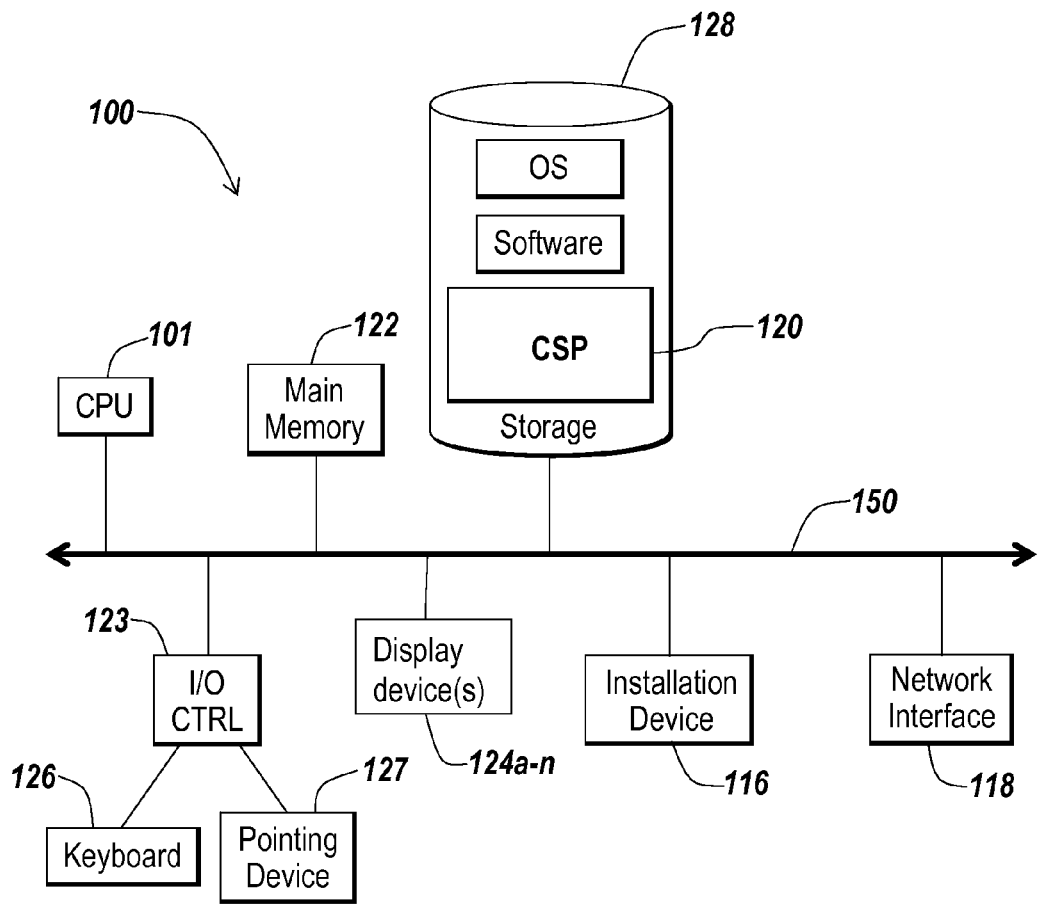
FIGS. 1E and 1F are block diagrams of an embodiment of a computing device useful in an embodiment of a solution provided by the present application.
Figure 1F:
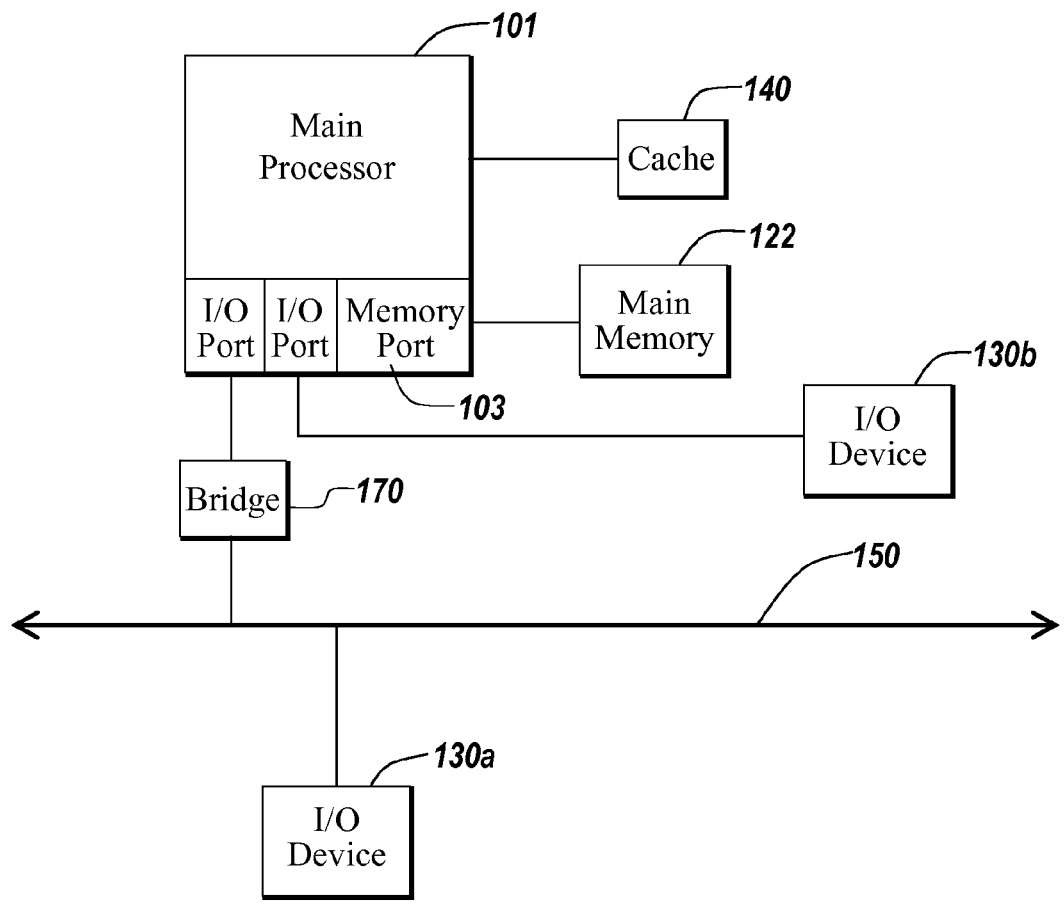

FIGS. 1E and 1F depict block diagrams of a computing device 100 useful for practicing an embodiment of the present solution. As shown in FIGS. 1D and 1E, each computing device 100 includes a central processing unit 101, and a main memory unit 122. As shown in FIG. 1D, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1D, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1E the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1D, the processor 101 communicates with various J/O devices 130 via a local system bus 150. Various busses may be used to connect the central processing unit 101 to any of the J/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1E depicts an embodiment of a computer 100 in which the main processor 101 communicates directly with I/O device 130 via HyperTransport, Rapid I/O, or InfiniBand. FIG. 1E also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as the configuration tool 110, or portion thereof. The computing device 100 may further comprise a storage device 128, such as one or more hard disk drives or redundant arrays of independent disks, for storing an operating system and other related software, and for storing application software programs such as any program related to the control panel 110. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1D. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

C. Methods of Controlling Lights Delivered to Products in Display

Figure 2:
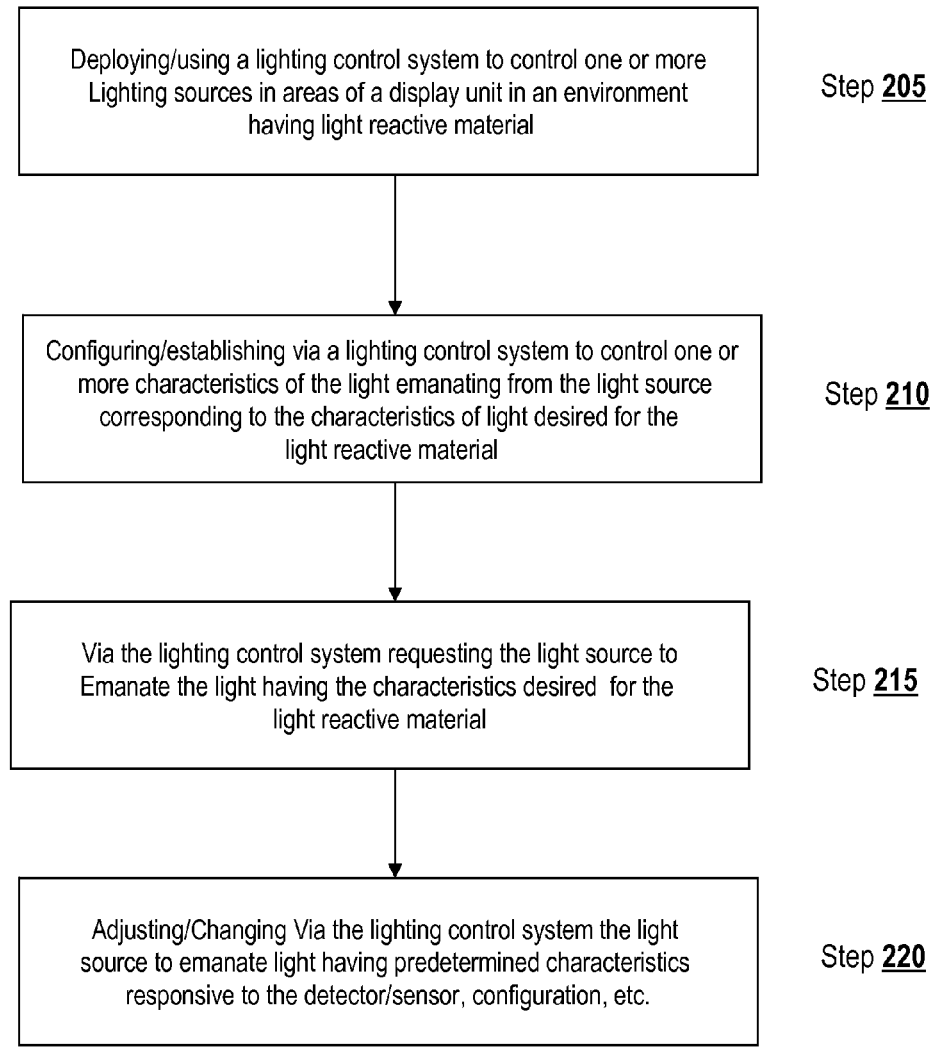
FIG. 2 is a flow diagram of an embodiment of a method for controlling characteristics of light from a light source in association with products presented for display.

Referring now to FIG. 2, an embodiment of steps of a method 200 for controlling characteristics of light emanating from a light source in association with products presented for display is illustrated. In brief overview of method 200, at step 205, a lighting control system 175 is deployed or used to control one or more lighting sources in areas of a display unit in an environment having light reactive material. The light reactive material may react to one or more predetermined characteristics of light. For example, the lighting control system 175 is used in conjunction with a display unit 102 for displaying products or product related features in an environment such as a store, a display station in a mall, or a refrigerator in a store. At step 210, the lighting control system 175 is configured to establish one or more characteristics of the light emanating from the light source to correspond to the characteristics of light desired for the light reactive material to be reactive. In this step, configuration may be any type of system settings, calibration values, instructions, or commands customized for a given light reactive material illuminated. At step 215, the lighting control system 175 directs the light source to emanate the light having the established characteristics desired for the light reactive material. At step 220, the lighting control system 175 may change or adjust the predetermined characteristics of the emanating light source responsive to a detector, further configuration, etc. The system may be responsive to any changes in environment conditions by changing the light source accordingly.

In more detail, at step 205, any type and form of lighting control system 175 may be deployed with any type and form of display unit 102 or otherwise in any environment. In one embodiment, the lighting control system 175 is installed and operated to control one or more lighting sources of a display unit having products with light reactive material. In another embodiment, the lighting control system 175 is installed and operated to control one or more lighting sources of a display unit having portions of the display unit with light reactive material. In other embodiments, the lighting control system 175 is installed and operated to control one or more lighting sources in any environment having light reactive material external to the product and/or display unit. In some embodiments, the lighting control system may be deployed remote to the product and/or display unit. For example, the lighting control system may operate on a computing device in a location remote to the display unit and communicate with the light sources 104 via a network 103. In another embodiment, the lighting control system 175 is deployed in the vicinity of the display unit but not attached to or connected to the display unit. For example, a lighting control system 175 may be deployed in a first or central location to control and manage light sources 104 for a plurality of display units in multiple locations.

By way of example, a lighting control system 175 deployed in step 205 may be a system inside a clothing store where a brand of clothing is displayed under a UV light in order to emphasize photoluminescent features of the logos on the clothing. A system may also be deployed to create a light show effect of water or a sea breeze when illuminating a brand of body wash products. In another example, the lighting control system 175 is deployed to illuminate fruits, vegetables or other products stored in a refrigerator in a supermarket.

Also in another example, a lighting control system 175 deployed in step 205 may be a system inside a clothing store where a brand of clothing is displayed under a blue light in order to emphasize photoluminescent features of the logos on the clothing. A system may also be deployed to create a light show effect of water or a sea breeze when illuminating a brand of body wash products. In another example, the lighting control system 175 is deployed to illuminate fruits, vegetables or other products stored in a refrigerator in a supermarket.

The lighting control system 175 may be deployed to control light sources to cause a reaction in any type and form of light reactive material 114. In case where the light emanating from a light source illuminates a light reactive material that induces a response from the material, including a response inside of it, response on its surface, or a change in a perception to a viewer, the given material then is a light reactive material. In some embodiments, a light emanating from a light source and illuminating a vegetable stored inside a refrigerator may initiate a process of photosynthesis inside a vegetable, then the vegetable may be considered a light reactive material. In another embodiment, a light emanating from a light source and illuminating vegetables may have characteristics which kill the bacteria inside and on the surface of vegetables. The vegetable being illuminated is, in this case also, a light reactive material. In yet another embodiment, a light source is illuminating a product for the purpose of color rendering, which alters the perception of the color in the eye of the consumer due to the combination of the color of the illuminated object and the color of light illuminating the object, the object being illuminated is also a light reactive material.

At step 210, the lighting control system 175 may be configured or instructed by any means to establish or set the characteristics of the light emanating from the light source to correspond to the characteristics of light desired for the light reactive material. In some cases, the lighting control system 175 is configured dynamically during operation. In other embodiments, the lighting control system 175 is configured statically or between operations. In one embodiment, the lighting control system 175 may be configured via a configuration tool 110. In another embodiment, the lighting control system 175 may be configured via a command panel 110. In other embodiments, the lighting control system 175, such as via the UIM or LCM, may receive instructions via a network 103 to establish the characteristics of light emanating from the light source. In some embodiments, the lighting control system 175 sets or establishes the characteristics of light emanating from the light source responsive to information received from any one or more detectors 112, 180. In yet another embodiment, the lighting control system 175 is pre-configured or preset to emanate light have the desired characteristics corresponding to the light reactive material.

Via the configuration, the lighting control system may establish any parameters or settings representing the characteristics of light to emanate from the light source, such as color, wavelength, frequency, intensity, etc. Configuration or establishment of the lighting control system 175 may include the setting, calibration or adjustment of any type of parameters or settings via any type of interface, such as an application programming interface, graphical user interface or command line interface. Configuration may include issuing any commands or instructions. In some embodiments, configuration may include the use of any type and form of protocols, software programs, control scripts or any other type of instructions to control the characteristics of the emitted light tailored to the needs of the light reactive material. In one case, configuration may take place via a network connection to the lighting control system 175, such as via an Internet connection. Another way to configure the system may be using a blue tooth receiver to send commands or instructions to the lighting control system 175 from any type and form of mobile device. Furthermore, the system settings and configuration parameters may be stored in memory or storage of the lighting control system during installation. In some cases, one or more commands may be used to activate the stored configuration settings. The lighting control system may also be pre-configured by the factory at time of manufacture and/or prior to installation or shipment.

At step 215, the lighting control system 175 directs, requests or instructs the light source to emanate light having the configured or established characteristics desired for the light reactive material. Responsive to the establishment of the lighting characteristics at step 210, the lighting control system 175 directs the light sources to provide light in accordance with the desired characteristics for the light reactive material 114. In some embodiments, the lighting control system 175 turns on the light source 104. Upon powering up, the light source 204 may provide the light in accordance with the established characteristics. In other embodiments, the light source is already powered on and the lighting control system 175 changes or adjusts the characteristics of light emanating from the light source. In some embodiments, the lighting control system 175 is controlling multiple lights sources directed to the light reactive material 114. Responsive to the established light characteristics at step 215, the lighting control system 175 may direct one light source of the multiple light sources to emanate the established lighting characteristics towards the light reactive material. In another embodiment, the lighting control system 175 may direct all or more than one of the multiple light sources to emanate the established lighting characteristics towards the light reactive material.

In one embodiment, at step 215, since the system is configured to the settings desired for a given product or a display feature, the request is sent by the lighting control system for the light source to emanate light according to the established light characteristics. In one embodiment, this request may originate for the user sending the command via a remote control associated with the system. The lighting control system 175, such as via UIM, receives the request and sends the request to an LCM as depicted in FIG. 1D. The LCM then issues the command and the instructions associated with the illumination characteristics for a specific light reactive material to the LED Driver, which in response turns the LED 104 on in a way specified by the LCM. In another example, a request may also be issued to the lighting control system 175 via a network, which in response sends the commands and instructions to the LCM associated with the illumination characteristics of a specific light reactive material, which in response instructs the LED driver to turn the LED 104 on in a way specified by the instructions. Furthermore, in another example, a timer may trigger the request to the lighting control system 117, which in turn sends the command to emanate the light via the LCM and the LED Driver. In yet another example, a sensor 112 may be used to determine the presence of consumers in the environment of the display unit. In response, a request if forwarded to the lighting control system 175, which in turn sends the command to have light emanate accordingly via the LCM and the LED Driver. Any number of means or methods may be used to trigger the request for the lighting control system to cause the light source to emanate according to the desired lighting characteristics.

At step 220, the output of the light source is adjusted or changed, via the lighting control system 175, to emanate light having predetermined characteristics responsive to detectors, sensors, configuration, etc. While the system is in operation and the light is illuminating from the light source towards the area having light reactive material, requests may be issued via the lighting control system 175 to alter the characteristics of the light output. For example, a product may be changed in the area of the display 102, for example from one product to another product, such as red apples. In one embodiment, the lighting control system 175 may adjust the output of the light emanating towards an assortment of red apples replacing a previous product which required a different light illumination from that desired for the red apples. Upon placing the red apples into the area of the display unit 102, a detector or user may send a signal to the lighting control system 175 to change the light properties of the emanating light for the new product, such as a stronger red color component in order to use color rendering when displaying the red apples.

In another example, an enclosed refrigerator may display vegetables and fruits and have a door monitored by an interlock sensor. The refrigerator may include two separate light sources. The first light source may be a UV light source which illuminates vegetables with UV light, killing bacteria while the sensor monitoring the door is detecting the doors of the fridge to be closed. The second light source may be a white light source, turned on only when the doors of the refrigerator are opened. The light emitted inside the fridge is initially a UV light emitted from the first light source. When the user opens the door, the user triggers the sensor to send the request to the lighting control system 175 to switch the light source, which in turns sends the commands and instructions to the LCM and LED Driver to turn off the UV light source and turn on the second white light source. The user then has a clearer view of the refrigerator. However, once the doors are closed again, the sensor sends another command to the lighting control system 175 to turn of the white light source and resume UV light illumination of the products inside the fridge.

One embodiment that provides another example of method 200 described above includes a lighting control system 175 to control an array of lighting sources for emanating light having wavelength properties that promote photosynthesis in vegetables, such as vegetables stored in a refrigerator inside a store. In this example, the lighting control system 175 requires controls one or more light source to illuminate an area in the refrigerator displaying green vegetables using a white light in the presence of consumers in the vicinity of the refrigerator. In the absence of consumers near the refrigerator, the lighting control system 175 shifts the wavelength spectrum of the light emanating from the light source 104 to a spectrum with a dominating 590 nm wavelength in order to promote the process of photosynthesis within the leaves of the vegetables. The 590 nm wavelength dominated light helps the vegetables creating chlorophyll, making them look greener, and also helps the vegetables with the process of photosynthesis. The vegetables which are reacting to the 590 nm dominated light via the photosynthesis or the creation of chlorophyll, are the light reactive material in this example. The configuration of the lighting control system 175 may include establishment of two settings for the illumination of the vegetables. One setting is associated with white light illumination which is more presentable to the consumer, and the other setting is associated with a 590 nm light dominated illumination, which helps the vegetables with the process of creation or activation of chlorophyll and the process of photosynthesis.

While the store is closed or otherwise no customers are detected near the vicinity of the display unit 102, a detector 180 sends a signal to the lighting control system 175 that no movement is detected or otherwise an indication that there are no customers near the display unit. Upon receiving the request, the lighting control system 174 sends instructions to the LCM, which in response sends instructions to the LED Driver to emanate light from the LED 104. As the result, the light shifts to orange 590 nm wavelength dominated light, and the vegetables illuminated activate chlorophyll and maintain the process of photosynthesis. A detector 180 may sense the arrival of a customer near the vicinity of the display unit. The detector 180 then sends the request to the lighting control system 175, such as via network 104, which in response issues instructions to the LCM to turn off the 590 nm dominated light and turn on the white light. The 590 nm dominated light is turned off, and the white light is turned on.

Figure 3:
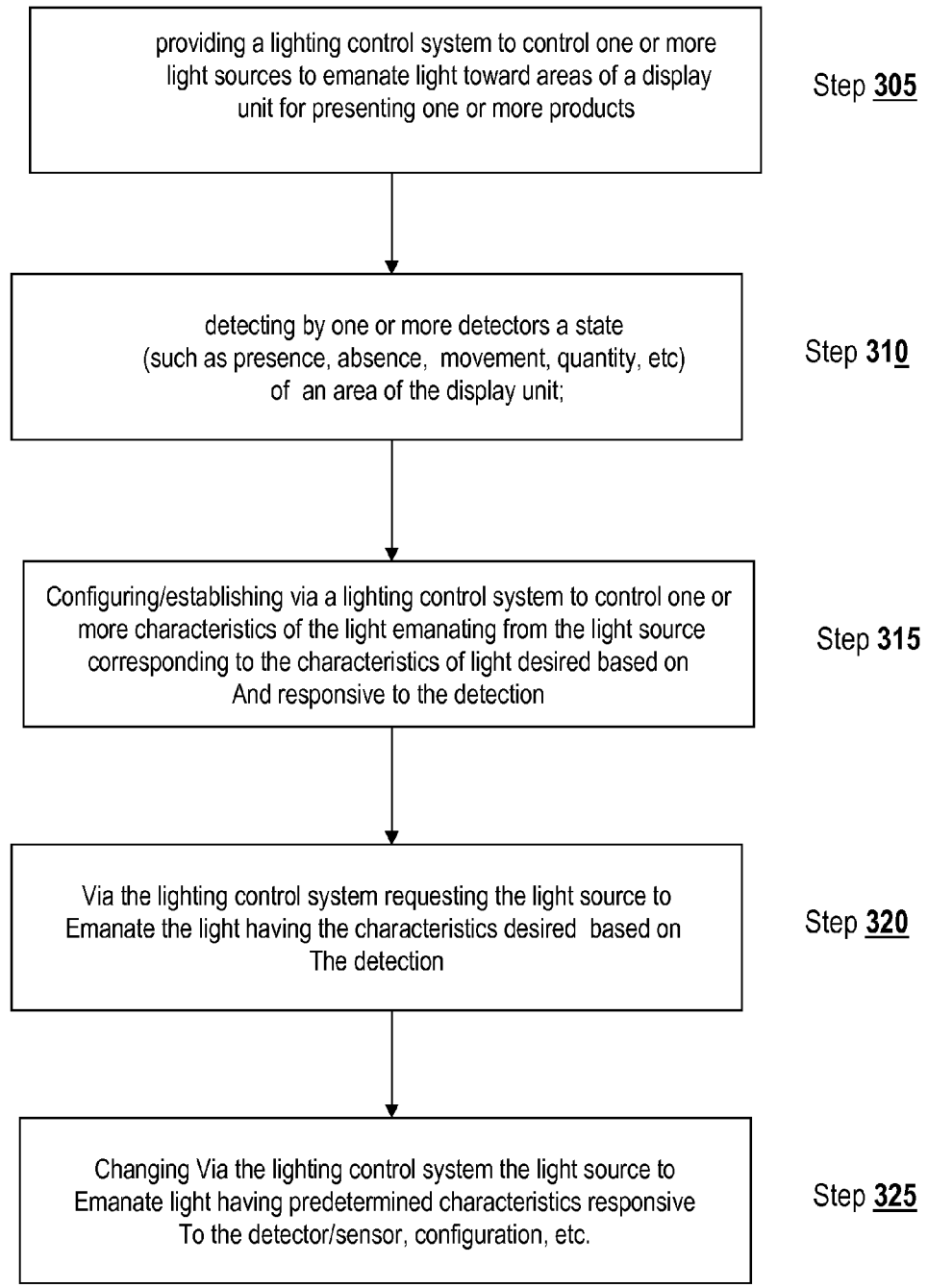
FIG. 3 is a flow diagram of an embodiment of a method for controlling characteristics of light from a light source in association with detection of products.

Referring now to FIG. 3, an embodiment of steps of a method 300 for controlling characteristics of light from a light source in association with one or more detectors is depicted. In brief overview of method 300, at step 305, a lighting control system 175 is used to control one or more light sources to emanate light toward areas of a display unit for presenting one or more products. At step 310, one or more detectors detect a state or condition of the environment, such as, presence, absence, movement, quantity, etc, of a product in an area of the display unit. At step 315, the lighting control system 175 is configured or managed to provide one or more characteristics of the light emanating from the light source to correspond to characteristics of light desired based on and responsive to detectors. At step 320, the lighting control system 175 requests or otherwise causes the light source to emanate the light having the characteristics desired based on the detection. At step 325, the lighting control system 175 may change or adapt the characteristics of the light emanating from light source to have predetermined characteristics responsive to the detector, sensor, configuration etc, such as from continuous monitoring of environmental states or conditions.

In further detail, in step 305, a lighting control system 175 is provided to control one or more LED light sources to emanate light toward areas of a display unit for presenting one or more products. The lighting control system 175 may be in communication with one or more detectors 112, 180, such as via a network 103. Any type and form of one or more of the same or different detectors 112, 180 may be deployed. The detectors 112, 180 may be deployed in any portion of the display unit, interior or exterior. In other embodiments, the detectors 112, 180 may be deployed to predesignated areas of a display unit for products. In another embodiment, the detectors 112, 180 may be placed, located and/or oriented in a manner to obtain appropriate or suitable detection of a state or condition.

The lighting control system 175 may be deployed in any type of environment and for a multitude of applications. For example, in one embodiment, a display unit may be set up inside a clothing store. The lighting control system 175, either local or remote to the display unit, controls a plurality of lighting sources illuminating light towards a brand of clothing using a UV light in order to emphasize the brand logos on the clothing, The brand logos may include contains photoluminescent light reactive material. Another example may be a system to create a light show effect of water, fire, or a sea breeze when illuminating a brand of body wash products in a store window. In another example, the lighting control system controls light sources inside a fridge having vegetables or fruits. Other examples may include color rendering applications, involving a display unit with a lighting control system which controls the characteristics of the light illuminating the products presented via the display unit.

At step 310, one or more detectors may detect any state or condition of the environment, such as a state or condition of the products, or the ambient environment of the display unit or product. In yet other embodiments, the detector may detect any state or condition of an environment remote to the product or display unit, such as the temperature in a remote location. In one embodiment, one or more detectors may detect a state of presence, absence, movement, or quantity of products in an area of a display unit. In other embodiments, the detectors may detect a color or color temperature of a product. In some embodiments, the detector may determine via a bar code and/or RFID tag information about the product. An example of such instance could be a consumer approaching the shelf comprising products to be illuminated via a light show. Another example may be the sensor detecting the absence of products left in the shelf on the display such as via a weight or pressure sensor. Other embodiment may involve sensors detecting a user or object movement, a temperature, or sound from the area or the environment surrounding the system. Other examples may also include any system involving a sensor detection of any kind for the purpose of detecting a state of an area, or a state of any of the relevant parameters from the area or a surrounding environment. The detectors may communicate information in any format or via any protocol to the lighting control system 175.

At step 315, responsive to the detectors or information provided by the detectors, the lighting control system 175 adapts or establishes one or more characteristics of the light emanating from the light source to correspond to predetermined characteristics of light desired based on and responsive to the detection. One example of this method is configuring a light control system 175 to have settings specified and assign to each of the products which may be displayed in an area. The settings of the lighting control system 175 may be as such that the lighting control systems makes adjustments to the characteristics of the light emanating from the light sources in response to a signal from a detector. An example of this embodiments, is configuring the lighting control system 175 such that a first setting is used for a light having a first characteristics for a display of green vegetables and a second setting for a light having a second characteristic for display of red apples. The lighting control system 175 may change between two settings responsive to the detector sensing the tags associated with products. The lighting control system 175 may be configured in any way to have settings for light characteristics associated with each of the products, and the change of the settings being responsive to a signal from a detector. The lighting control system 175 may dynamically establish or change the characteristics of the light emanating from a light source based on any business rules and information received from one or more detectors.

In further details, at step 320, the lighting control system requests the light source to emanate the light having the characteristics desired based on the detection. In one embodiment, the lighting control system 175 makes the request immediately upon detection. In another embodiment, the lighting control system 175 makes the request upon a predetermined time after receiving the detection or otherwise a predetermined delay. In other embodiments, the lighting control system 175 makes the request upon receiving a second detection or upon other information received from any other detector. In yet one embodiment, the lighting control system 175 requests the light source to emanate the light having the characteristics desired based on signals or information from multiple detectors, such as detection of a predetermined product and a temperature. In some embodiments, the lighting control system 175 controls light from a single light source based on the detection. In other embodiments, the lighting control system 175 controls light from multiple light sources based on the detection.

In one example, a detector senses arrival of a customer at the display or into a store and sends a signal to the light control system. In response to the signal, the lighting control system 175 may adjust the lighting of the light source from one spectrum of lighting to another spectrum of lighting. In another example, the lighting control system may switch between white light to the UV light responsive to detection that the doors of a display unit are closed.

At step 325, the lighting control system 175 may continuously change or adapt the characteristics of the light emanating from the light source to one more predetermined characteristics responsive to the detector, control panel, information received via the network, etc. As the lighting control system receives signals from one or more detectors, the lighting control system dynamically adjusts the characteristics of the light emanating from the light sources based on and responsive to the detections. For example, as the ambient environment to the product or display unit changes, the lighting control system changes the characteristics of the light emanating from the light sources in response to the changes in the ambient environment. The lighting control system 175 may make adjustments to the light characteristics on a predetermined frequency based on the most recent detected information. In other embodiments, the lighting control system 175 may make adjustments to the light characteristics upon receipt of signals from a detector or receipt of signals from multiple detectors.

EXAMPLES

In view of the structure, functions and operations of the systems and methods described above, the present solution may be used for improving marketability and enhancing brand recognition of products. The systems and methods described herein may be used in any one or more of the following examples to be discussed below: 1) color rendering applications, 2) sensor integration applications, 3) food preservation applications, 4) stocking level alert applications, 5) special effects applications and 6) energy savings applications.

In the example embodiment of a color rendering application, the systems and methods of the present solution is utilized for the purpose of improving the presentation of a product by enhancing or altering the colors of products as perceived by the consumer. Color rendering, according to the Illuminating Engineering Society of North America (IESNA), is the measure of the degree of color shift objects undergo when illuminated by the light source as compared with the color those same objects when illuminated by a reference source of comparable color temperature. In one embodiment, a lighting control system may be configured to have preset selections for different types of food, and colors associated with it so that the user may use a user interface module to change the settings for the products currently being displayed. The system may feature a touch screen interface, buttons, or a control panel display listing various types of products, such as meats, vegetables, beverages, fruits, etc., which contain preset characteristics of light aimed at augmenting certain features of the products. For example, a "Red Meat" button may have a number of configuration settings for the lighting control system associated including the color temperature settings for the light source for illuminating the red meat displayed with a light that makes the red meat appear more red. Another button on the user interface module may be a "Chicken" button. Since the chicken is yellow/brown in appearance, the configuration settings associated with this button may include the instructions for the lighting system to bias the white light to include a stronger yellow and orange components of light bringing out the color of the chicken.

There may also be a button for metal or reflective objects which generally are intended to appear very pure, sleek, and shiny. For color rendering applications, the lighting control system maybe configured for a number of different settings and configurations tailored to achieve a color of the products desired to be perceived as by the consumer. In some embodiments, the system may integrate red, green and blue LEDs, or other variations such as a white LED with amber, to achieve different color temperatures for color rendering. In other embodiments, the system may comprise a wireless network communicating between different units utilizing wireless protocols such as Zigbee.

In an example of a sensor integration application, a color rendering lighting control system may include one or more sensors that detect color or colors of the environment. For example, a display unit may feature a color sensor placed in the display unit at a location to sense or establish a product's color. The sensor detects the color of the product, and provides information on the detected color to the lighting control system. In response to the detection, the lighting control system adjusts the settings of the light source associated with the product displayed. Such a feature enables a user to make simple adjustments for the fine tuned auto-calibrated color rendering of any product displayed in any display unit.

In further sensor integration examples, the system may utilize any number of different sensors or detectors, such as detectors for motion, light, sound, proximity, metal, weight, touch, etc. One such embodiment may be a lighting control system receiving a signal from an interfaced radio frequency identification detector (RFID). For example, a grocery store or a supermarket may utilize a particular store card in order to offer the customers discounts and track customer purchases. A store card, associated with a user may have a RFID tag for use at the store. A database for the store may include a history of consumer's previous purchases, and may assign individual configuration settings for a particular consumer for any given line of products based on the consumer's purchasing history. Once the system detects the proximity of the user to a display unit, the lighting control system, in response to the detection, may adjust the lighting characteristics of light emanating to the shelves and areas in the vicinity based on the configuration settings for the consumer. The system may also utilize the database including the history of consumer's previous purchases to recommend sale items for which the customer may be interested. The system may adjust the lighting characteristics of light emanating from light sources to direct the consumer's attention to such sale items.

In another example application, the systems and methods of the present solution may be tailored for a range of food preservation applications. In one embodiment, a display unit may be utilized to promote photosynthesis in vegetables and greens stored in a display area. The lighting control system may deliver light having a strong orange light component for assisting the plants in activating chlorophyll. As a result, several days later, the green vegetables may look even greener. In another embodiment, a lighting control system may be configured with a motion sensor which upon detecting the motion in the presence of the display unit sends the signal to the lighting control system, which in response changes the lighting from orange lighting to a white light. In one embodiment, a cabbage stored in refrigeration display may be exposed to a light which enhances Vitamin C and chlorophyll of the cabbage. Such a health oriented application may utilize a 590 nm dominated light in a combination with specific humidity levels inside the refrigerator to make the vegetables greener and enhance the Vitamin C and Vitamin D levels. In a further embodiment, a pulsating UV light may be utilized inside a refrigerator storing vegetables, fruits, milk and other foods in order to kill the bacteria living in the foods. In embodiments relating the pulsating UV light application for killing bacteria in the foods, a timer, or a motion sensor may be employed. For example, a store that closes at 12:00 A.M. may program the controller to activate the UV LED system at 12:30 A.M. every night and return to normal operation at 6:00 A.M.

In yet another example application, the systems and methods of the present solution may be used for a range of stocking applications, such as stock alerts and inventory level alerts. In some embodiments, the lighting control system allows entering in product information data to the display cabinet for the products being displayed and utilizing the system to provide particular feedback based on this product information. In one embodiment, the product information data entered is related to the restocking alerts. In another embodiment, the display unit interfaces with the system having the product information data entered via a wired network or even wirelessly. In a group of embodiments, sensors may be utilized for monitoring stocking applications. In one embodiment, a weight sensor may be used in a display area to signal a stocking level of a display shelf. In another embodiment, a weight sensor may be used in a display area to indicate an appropriate time for restocking the products displayed, or to calculate how many items can be stored on a fully stocked shelf. For example, in the instances where sensors are used for monitoring the stocking level of shelves, the user may determine an acceptable amount of goods on a shelf to be considered a fully stocked shelf. At the end of the day, after customers have left, the user may push a button to "show all un-stocked shelves" and the lighting control system in response illuminates all of the shelves in red (or any color) alerting the user that the illuminated shelves need to be restocked for the next day. Many of these features may also be determined through the already existing product databases in the store, but the integration of the lighting control system to process information from these databases and display it, may be useful. For example, a shelf may light red or change color for a really high selling item or to alert a user of an unusually high selling day for an otherwise slow moving item.

In another group of applications, the lighting control system may include configuration settings for a dynamic lighting display of special effects, such as water effect, the ocean effect, sea breeze, fire effects, etc. For example, a system could be programmed to provide a moving water effect by subtly shifting colors from blues, greens and whites. A similar effect could also be achieved for grilled products whereas the lighting system dynamically changes to portray a fire around the product being displayed in order to heighten the user's senses. This may be beneficial in applications such as frozen food sections which are very sterile and bland so the lighting system could be used as way to draw people to a particular product. Another advantage of the system is the flexibility due to configurability of the system. If one month the display is for brick oven pizza and the user wants the flame effect, the lighting control system may be set to this particular mode, while it could be back to normal operation with no cost to the user just after a very simple settings adjustment.

In another group of applications, the systems and methods of the present solution may be used for a range of energy saving applications. In one embodiment, the system allows integration of sensors to the control system for energy saving purposes by dimming the lights or turning them off during low traffic hours. For example, if a motion sensor was mounted in a certain area of the store or integrated into the display case, it may be networked to one or more control systems in order to control the lights based on activity. For example, as long as there is motion in front of a display the lights stay on at full brightness. After 30 minutes but less than 2 hours, the lights dim to 50%. If sensors sense motion, during this time, the lights go back to 100% and restart the timer. If after 2 hours the sensors sense no motion, the lights may dim to 10% or shut off completely. Using embodiments such as described in these examples, a lighting control system may be configured to save on the store's energy cost.

We claim:

1. A method for improving marketability of a product by controlling a characteristic of light emanating from a light source to an area of a display unit for presenting the product, the method comprising the steps of:
    (a) providing a lighting control system to control a light source that emanates light toward an area of a display unit for presenting one or more products, the one or more products comprising a light reactive portion reactive to one or more predetermined characteristics of light;
    (b) establishing, via the lighting control system, one or more characteristics of light to emanate from the light source to correspond to the one or more predetermined characteristics of the light reactive portion of the one or more products; and
    (c) requesting, via the lighting control system, the light source to emanate light having the established one or more characteristics, the light reactive portion of the one or more products reacting to the emanating light.

2. The method of claim 1, wherein the light reactive portion of the one or more products comprises one of an interior or exterior surface of packaging having a coating responsive to a predetermined wavelength characteristic of a light source.

3. The method of claim 2, wherein step (b) comprises establishing, via the lighting control system, the one or more characteristics of the light to emanate from the light source to correspond to the predetermined wavelength characteristic.

4. The method of claim 1, wherein the light reactive portion of the one or more products comprises a color pigment.

5. The method of claim 4, wherein step (b) comprises establishing, via the lighting control system, the one or more characteristics of the light to emanate from the light source to change an appearance of the color pigment to one of a different color or having a different intensity of color.

6. The method of claim 1, wherein the light reactive portion of the one or more products comprises a dye that is not visible when exposed to one or more wavelengths of light.

7. The method of claim 6, wherein step (b) comprises establishing, via the lighting control system, the one or more characteristics of the light to emanate from the light source to correspond to a wavelength for which to activate the dye as visible.

8. The method of claim 1, wherein the light reactive portion of the one or more products comprise a message that is visible upon receiving light having a predetermined wavelength.

9. The method of claim 1, wherein step (b) comprises establishing, via the lighting control system, the one or more characteristics of the light to emanate from the light source to correspond to the predetermined wavelength to make the message visible.

10. The method of claim 1, further comprising controlling, via the lighting control system, one of a color or an intensity of light emanating from the light source.

11. The method of claim 1, wherein step (b) comprises setting, via the lighting control system, a wavelength characteristic of the light to emanate from the light source to comprise a wavelength in one wavelength bin of a range of wavelength bins corresponding to the one or more predetermined characteristics of the light reactive portion.

12. The method of claim 1, comprising establishing, via the lighting control system, a first wavelength of light emanating from the first light source and a second wavelength of light emanating from the second light source.

13. The method of claim 1, comprising detecting, by the first detector, presence of a second product in the first area of the display unit, and responsive to the detection, establishing, by the lighting control system, one or more characteristics of the light emanating from the first light source to correspond to one or more predetermined characteristics of light identified for the second product.

14. The method of claim 1, comprising configuring the lighting controlling system to have a first set of one or more characteristics of light identified for the first product to emanate from the first light source and a second set of one or more characteristics of light identified for the second product to emanate from the second light source.

15. A method for improving marketability of products by controlling characteristics of light from light sources emanating to areas of the display unit for presenting the products, the method comprising the steps of:
    (a) providing a lighting control system to control one or more light sources to emanate light toward areas of a display unit for presenting one or more products, a first light source emanating light toward a first area of the display unit for presenting a first product,
    (b) detecting, by a first detector, presence of at least one unit of the first product in the first area of the display unit;
    (c) establishing, via a lighting control system, one or more characteristics of light to emanate from the first light source to correspond to one or more predetermined characteristics of light identified for the first product; and
    (d) requesting, via the lighting control system responsive to the detection, the first light source to emanate light having the established one or more characteristics.

16. The method of claim 15, wherein a second light source emanates light toward a second area of the display unit for presenting a second product.

17. The method of claim 16, comprising detecting, by one of the first detector or a second detector, presence of at least one unit of the second product in the second area of the display unit.

18. The method of claim 17, comprising establishing, via the lighting control system, one or more characteristics of light to emanate from the second light source to correspond to one or more predetermined characteristics of light identified for the second product, and requesting the second light source to emanate light having the established one or more characteristics.

19. The method of claim 16, comprising detecting, by the first detector, a movement of one or more units of the first product in the first area, and changing, by the lighting control system, one or more characteristics of light emanating from the first light source responsive to the detection of movement.

20. The method of claim 16, wherein step (b) comprising detecting, by the first detector, an absence of one or more units of the first product in the first area, and establishing, by the lighting control system, one or more characteristics of the light emanating from the first light source responsive to the detection.

21. A method for improving marketability of products by controlling characteristics of light from light sources emanating to areas of the display unit for presenting the products based on information about ambient environment of the products, the method comprising the steps of:
- (a) providing a lighting control system to control one or more light sources to emanate light toward areas of a display unit for presenting one or more products,
- (b) detecting, by a first detector, information about ambient environment of the one or more products;
- (c) establishing, via a lighting control system, one or more characteristics of light to emanate from a light source of the one or more light sources to correspond to one or more predetermined characteristics of light based on the detected information about the ambient environment; and
- (d) requesting, via the lighting control system responsive to the detection, the light source to emanate light having the established one or more characteristics.

* * * * *